(12) United States Patent
Liang et al.

(10) Patent No.: US 12,358,071 B2
(45) Date of Patent: Jul. 15, 2025

(54) METHOD FOR FORMING A METAL MATRIX COMPOSITE STRUCTURE

(71) Applicant: Commonwealth Scientific and Industrial Research Organisation, Australian Capital Territory (AU)

(72) Inventors: Daniel Liang, Clayton (AU); Shiqin Yan, Clayton (AU); Kun Yang, Clayton (AU); Andrew Yob, Clayton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 0 days.

(21) Appl. No.: 18/283,253

(22) PCT Filed: Mar. 18, 2022

(86) PCT No.: PCT/AU2022/050243
§ 371 (c)(1),
(2) Date: Sep. 21, 2023

(87) PCT Pub. No.: WO2022/198263
PCT Pub. Date: Sep. 29, 2022

(65) Prior Publication Data
US 2024/0181559 A1 Jun. 6, 2024

(30) Foreign Application Priority Data
Mar. 22, 2021 (AU) .................... 2021900826

(51) Int. Cl.
*B23K 20/00* (2006.01)
*B23K 20/12* (2006.01)
(Continued)

(52) U.S. Cl.
CPC ........ *B23K 20/129* (2013.01); *B23K 20/1215* (2013.01); *B23K 20/125* (2013.01);
(Continued)

(58) Field of Classification Search
CPC .............. B23K 20/122; B23K 20/1255; B23K 20/1245; B23K 20/129; B23K 20/125;
(Continued)

(56) References Cited

U.S. PATENT DOCUMENTS 6,648,206 B2 * 11/2003 Nelson ................. B23K 20/227 228/2.1
7,163,138 B1 1/2007 Dudt et al.
(Continued)

FOREIGN PATENT DOCUMENTS

CN 103286434 A 9/2013
CN 107138960 A 9/2017
(Continued)

OTHER PUBLICATIONS

International Search Report and Written Opinion from PCT Application Serial No. PCT/AU2022/050243, dated Jun. 1, 2022, 10 pages.
(Continued)

*Primary Examiner* — Erin B Saad
(74) *Attorney, Agent, or Firm* — Kinney & Lange, P.A.

(57) ABSTRACT

A method for friction stir forming a metal matrix composite (MMC) structure (76). The method includes the step of providing a substrate (12) comprising a metallic material and securing a preformed MMC layer (14, 16) comprising an MMC material in a position overlying at least a portion of the substrate (12). The method further includes the step of friction stirring the preformed MMC layer (14, 16) with a friction stirring tool (50) which includes a rotating probe (56), including locating the probe (56) at a stirring depth at which the probe (56) extends through the preformed MMC layer (14, 16) into a portion of the substrate (12) and passing the tool (50) through the preformed MMC layer (14) at the stirring depth to friction stir the preformed MMC layer (14, (Continued)

16) and integrate the preformed MMC layer (14, 16) with the substrate (12).

19 Claims, 11 Drawing Sheets

(51) Int. Cl.
*B23K 103/16* (2006.01)
*B23K 103/18* (2006.01)

(52) U.S. Cl.
CPC ...... *B23K 20/1255* (2013.01); *B23K 2103/16* (2018.08); *B23K 2103/18* (2018.08)

(58) Field of Classification Search
CPC ... B23K 20/126; B23K 20/1265; B23K 20/26
See application file for complete search history.

(56) References Cited

U.S. PATENT DOCUMENTS

| | | | | |
|---|---|---|---|---|
| 7,905,383 | B1* | 3/2011 | Torng | B23K 20/128 228/248.1 |
| 8,893,954 | B2 | 11/2014 | Schultz et al. | |
| 8,966,759 | B1* | 3/2015 | Romero | H01L 23/473 29/890.032 |
| 9,003,649 | B1* | 4/2015 | Romero | B23K 20/127 29/830 |
| 2006/0124701 | A1* | 6/2006 | Chen | C22C 21/02 228/112.1 |
| 2007/0119276 | A1 | 5/2007 | Liu | |
| 2010/0092789 | A1* | 4/2010 | Heck | B32B 5/26 228/114.5 |
| 2010/0279146 | A1* | 11/2010 | Rowe | B23K 20/1255 228/2.1 |
| 2011/0073634 | A1* | 3/2011 | Packer | B23K 20/128 228/2.3 |
| 2011/0076419 | A1* | 3/2011 | Yang | B23K 26/32 148/714 |
| 2011/0113950 | A1 | 5/2011 | Reed et al. | |
| 2011/0315367 | A1* | 12/2011 | Romero | F28F 3/022 165/185 |
| 2012/0055977 | A1* | 3/2012 | Steel | B23K 20/1255 228/2.1 |
| 2012/0181324 | A1 | 7/2012 | Yamauchi et al. | |
| 2012/0202089 | A1* | 8/2012 | Hangai | C22C 21/06 228/114 |
| 2014/0183245 | A1* | 7/2014 | Yamaguchi | B23K 20/127 228/2.1 |
| 2014/0210070 | A1* | 7/2014 | Hori | B32B 15/01 428/615 |
| 2016/0008918 | A1* | 1/2016 | Burford | B23K 20/1255 228/2.1 |
| 2017/0050263 | A1* | 2/2017 | Wu | B23K 20/1245 |
| 2017/0304933 | A1* | 10/2017 | Miles | B23K 20/122 |
| 2018/0050420 | A1 | 2/2018 | Verma | |
| 2018/0361501 | A1* | 12/2018 | Hardwick | B33Y 10/00 |
| 2018/0369954 | A1 | 12/2018 | Sugimoto et al. | |
| 2021/0078107 | A1* | 3/2021 | Storck | B23K 26/0006 |
| 2022/0001486 | A1* | 1/2022 | Fujii | B23K 20/227 |
| 2023/0135888 | A1* | 5/2023 | Hori | B23K 20/129 228/103 |
| 2024/0181559 | A1* | 6/2024 | Liang | B23K 20/1215 |
| 2024/0253150 | A1* | 8/2024 | Seo | B23K 20/1225 |

FOREIGN PATENT DOCUMENTS

| | | |
|---|---|---|
| EP | 2489749 A1 | 8/2012 |
| JP | 2018094618 A | 6/2018 |
| TW | 201918309 A | 5/2019 |
| WO | 2020184483 A1 | 9/2020 |

OTHER PUBLICATIONS

S. Palanivel, et al., "Friction Stir Additive Manufacturing: Route to High Structural Performance", from The Minerals, Metals & Materials Society, vol. 67, No. 3, 2015, pp. 616-621.

* cited by examiner

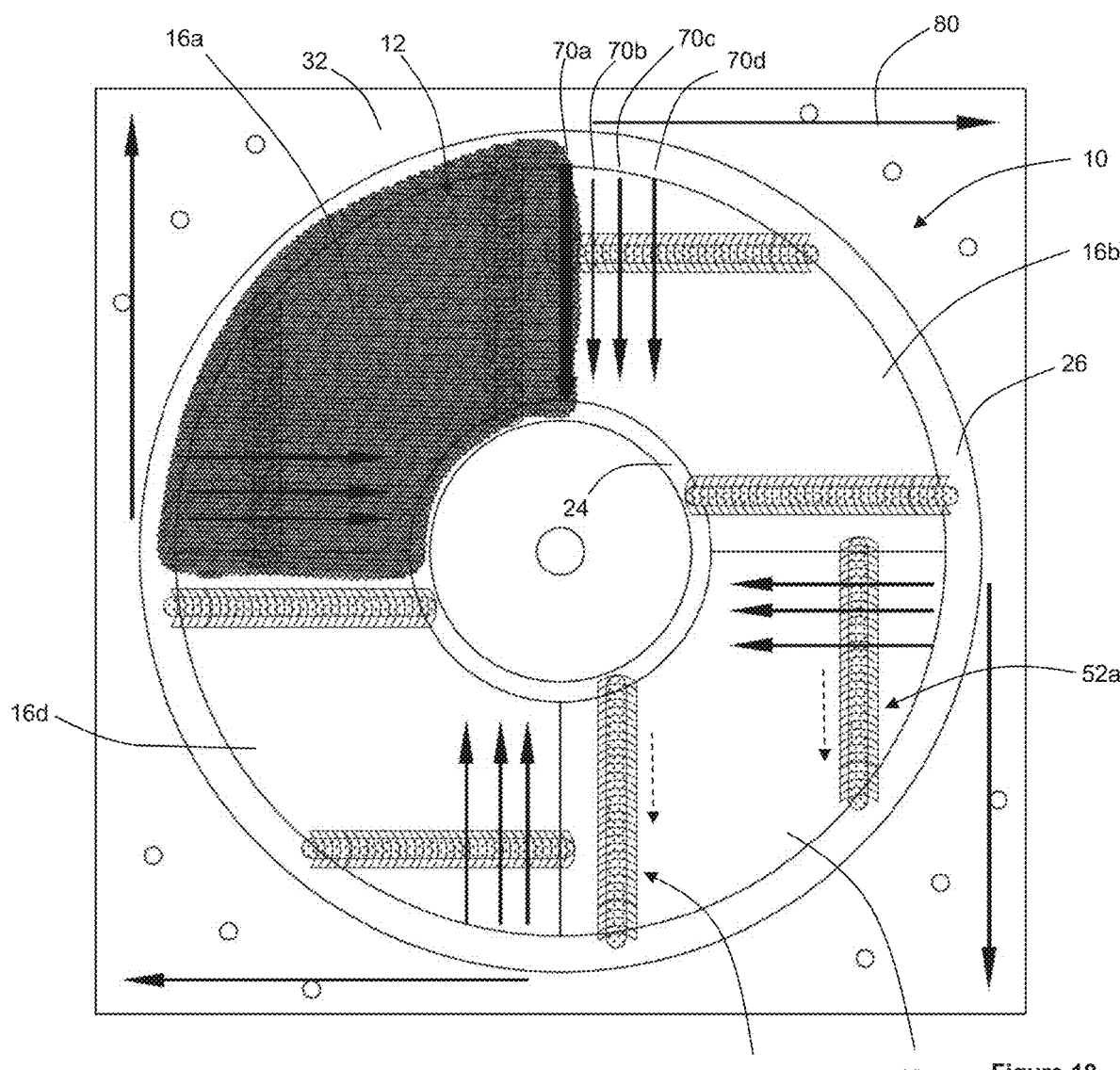
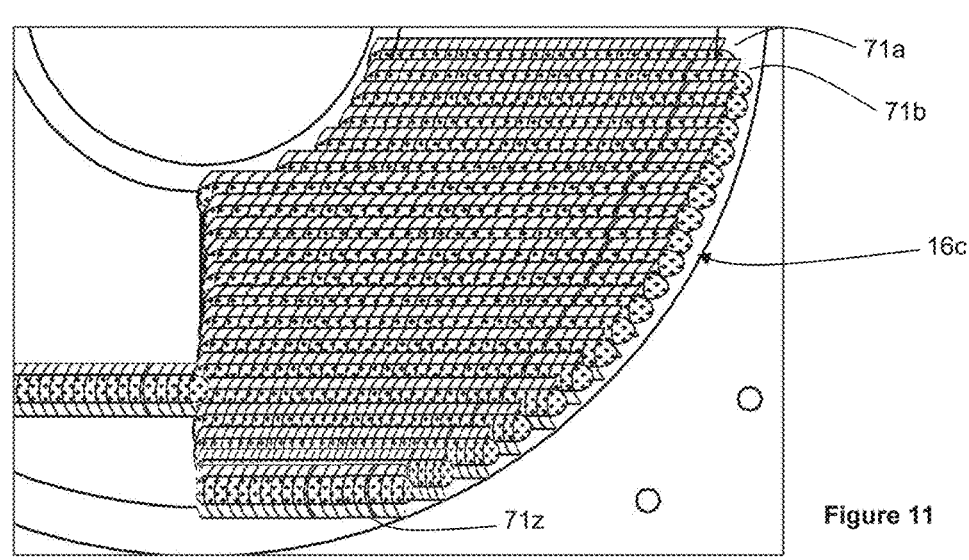
Figure 10
Figure 11

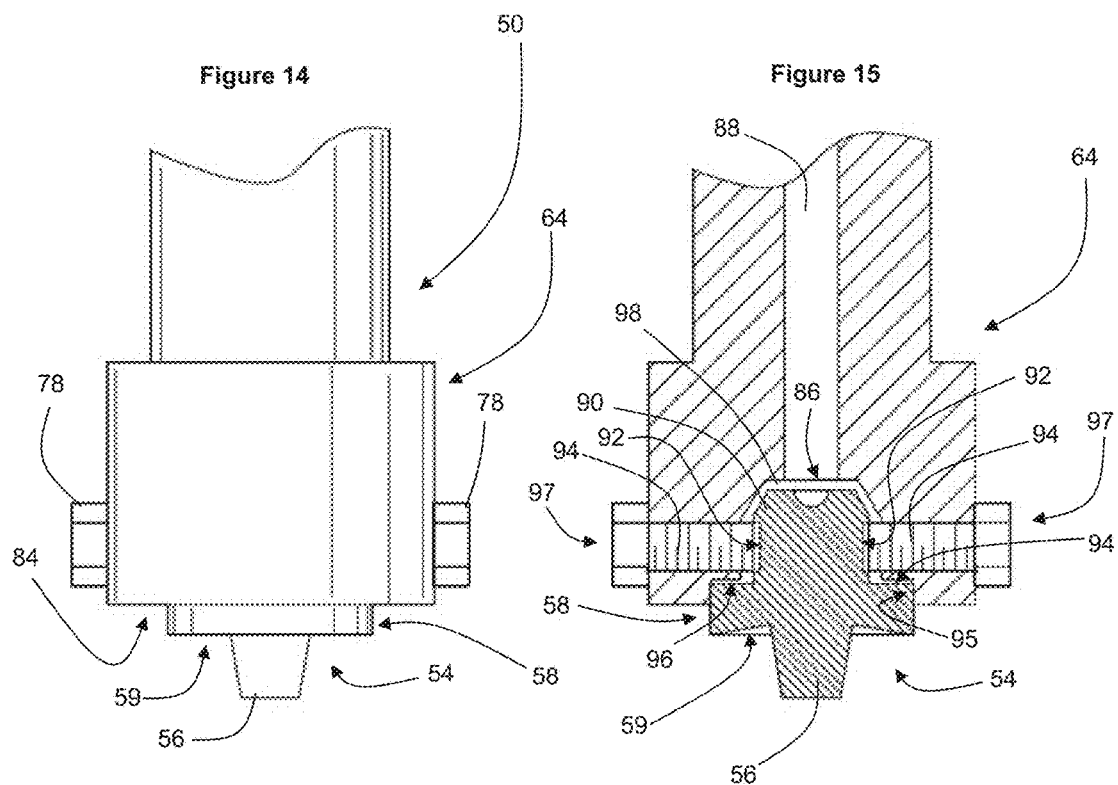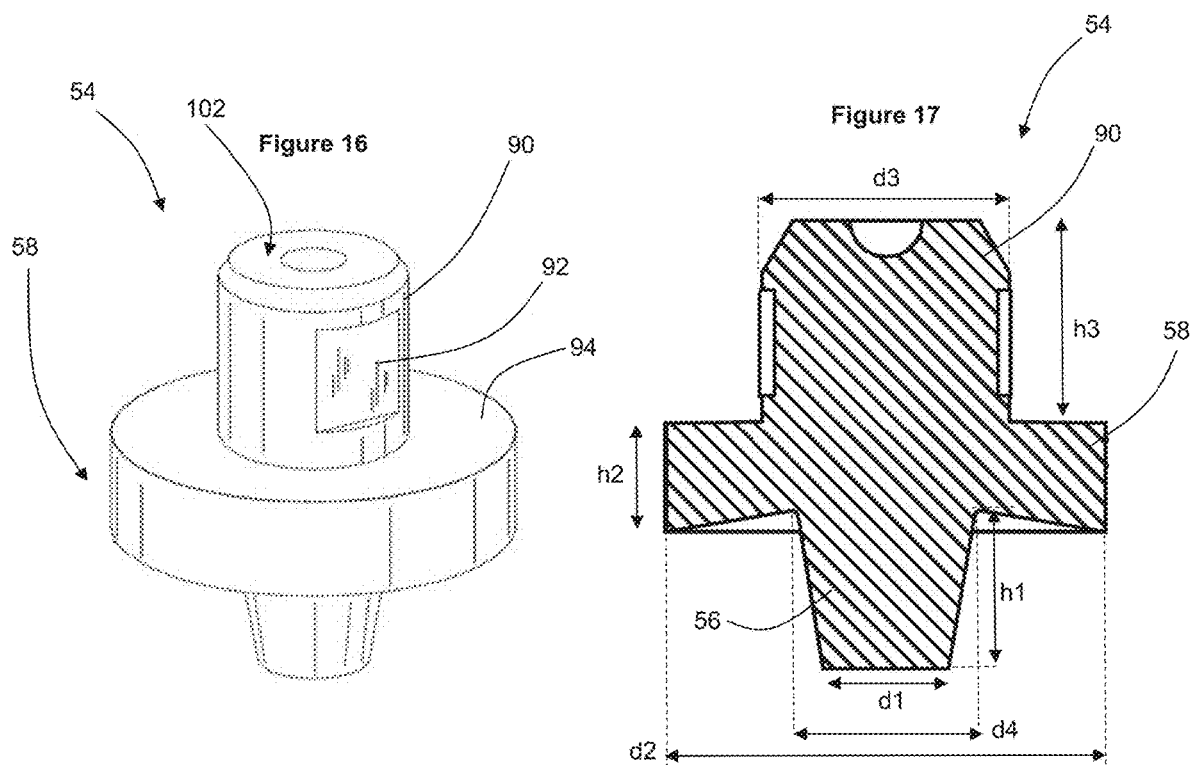

METHOD FOR FORMING A METAL MATRIX COMPOSITE STRUCTURE

PRIORITY CROSS-REFERENCE

The present application claims priority from Australian provisional patent application No. 2021900826 filed 22 Mar. 2021, the contents of which are incorporated herein by this reference.

TECHNICAL FIELD

The present invention relates to the forming of metal matrix composite (MMC) structures. The present invention is particularly applicable in the forming of large-size or bulk metal/ceramic MMCs and it will be convenient to hereinafter disclose the invention in relation to this exemplary application. However, it will be appreciated that the invention is not necessarily limited to this application and may be used in the formation of other sizes or types of MMC structures.

BACKGROUND OF INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Metal matrix composite (MMC) materials have found increasing application in a variety of fields. As well as having desirably high stiffness, strength and temperature resistance, MMCs are known for having superior dimensional stability and greater temperature and abrasion resistance as compared to polymer matrix composite (PMC) materials and also metal/metal MMC materials.

Typical MMC metal-phase materials include alloys of aluminium, titanium or magnesium. The matrix phase may be reinforced with a different metallic material such as tungsten or steel fibres but the reinforcement phase most commonly comprises ceramic materials such as boron carbide, silicon carbide, titanium carbide, aluminium oxide or the like. Metal/ceramic MMCs are particularly desired for use in high-temperature or high-strength components such as cutting tools, brake discs, engine components and aircraft componentry.

Traditional fabrication techniques for metal/ceramic MMCs include liquid-state methods such as stir casting or spray deposition. Achieving desirable homogenisation via liquid-state methods is difficult due to the tendency for ceramic powder to cluster, sink or float prior to solidification of the metal matrix, resulting in uneven particulate distribution.

Difficulties in achieving homogenised ceramic distribution typically increase with the volume of ceramic material that is introduced to the metal matrix. Where ceramic/metal MMC materials are produced having relatively high ceramic fraction via conventional methods (for example >20% and particularly >25% or >30%), the materials are often unsuited for industrial applications due to the relatively high number of microstructural defects caused by segregation of ceramic powder and/or voids and/or coarse matrix microstructures. These defects lead to poor properties, poor performance and premature/unpredictable material failure. Furthermore, the rate and/or severity of defects tends to increase with the size of the MMC material such that production of bulk metal/ceramic MMC structures is particularly challenging and/or the associated high cost is commercially unacceptable. Consequentially, in order to produce industrially acceptable components via conventional production techniques, the ceramic volume fraction is typically kept below 30%. In contrast, PMC materials such as carbon fibre-epoxy composite materials will commonly have a reinforcing phase volume fraction of >50%.

In response to these challenges, newer methods of fabricating MMC material have been proposed. In particular, solid-state forming techniques such as friction stirring.

Friction stirring is known particularly from its application to friction stir welding (FSW) in which a rotating probe generates sufficient heat to create a softened region at the interface between a pair of workpieces. The stirring tool is subsequently traversed along a join line to mechanically intermix the edges of the two workpieces. Whilst the metals are softened to facilitate mixing, they remain in the solid phase and therefore problems associated with transitioning to and from the liquid phase are avoided.

Friction stirring has been investigated for welding of MMC materials. For example, T. Prater, *Friction stir welding of metal matrix composite for use in aerospace structures*, Acta Astronaut 93 (2014) 366-373 and Marie-Noelle Avettand-Fenoel, Aude Simar, *A review about Friction Stir Welding of metal matrix composites*, Materials Characterization 120 (2016), pp. 1-17. However, these investigations focused only on the butt joining of an MMC component and not on a forming technology to form a new MMC structure, particularly a bulk MMC.

A method of forming a new MMC structure using friction stirring was proposed in *Mg based nano-composites fabricated by friction stir processing*", C. J. Lee, J. C. Huang, and P. J. Hsieh: Scripta Mater., 2006, vol. 54, pp. 1415-20 whereby grooves or holes in a metal substrate were cut and subsequently filled with ceramic powder. A stirring tool was traversed over the grooves to disperse the powder into the surrounding metal. However, this practice can produce only local composite enhancement in the region surrounding the groove i.e. only in a single line. Moreover, even if multiple powder-filled grooves were created and multiple passes of the stirring tool were performed, the engagement between the stirring tool and the powder tends to produce an undesirable or uneven powder distribution. Furthermore, the method will not be able to increase ceramic volume fraction to a high level.

U.S. Pat. No. 9,943,929 proposed another method of friction-based MMC fabrication whereby MMC constituent materials are deposited onto a substrate via a consumable feed rod extending through a friction stirring tool. The MMC is thereby formed in-situ on the substrate surface. However, this method is relatively complex and expensive in that the stirring tool must also be configured as a deposition tool. Furthermore, the method is only capable of, each time, depositing a thin smear of MMC material onto the substrate and with poor uniformity. Additionally, the stirring/deposition tool is not designed to penetrate the substrate and may therefore lack the layer adhesion required to create a large size or multi-layered MMC structure. Another drawback with this method is that a high ceramic volume fraction is not generally possible and the quality of material is generally limited to the quality of the consumable feed rod.

Another method of friction stir fabrication was disclosed in Chinese Patent publication CN103286434A in which metal-metal composites are formed via friction stirring and, in particular, an aluminium alloy plate stirred with a magnesium alloy plate. This method appears limited to the fabrication of metal-metal composites and not suitable for producing MMC having non-metallic reinforcement phase.

A further method of MMC fabrication is disclosed in Japanese patent publication JP2018094618A. This disclosure relates to formation of a laminated conjugate by joining, via friction agitation, a metallic material with a metallic plating layer formed thereon. In particular, the method is directed to improving rust and corrosion prevention by joining steel sheets with a aluminium layer of higher rust or corrosion resistance. The method appears limited to stir welding adjacent layers along 'joint portions' in order to form a welded assembly of discrete layers as opposed to forming large or bulk new MMC structures. This method also relates to friction agitation of two metallic components and is not suitable for producing MMC having non-metallic reinforcement phase.

A further method of friction stir welding is disclosed in Taiwanese patent publication TW201918309A. This relates to a method of welding a metal plate and a ceramic plate. The ceramic plate is located on a heating element to preheat the ceramic plate and reduce the risk of thermal shock during a subsequent friction stirring process. The metal plate overlies the heated ceramic plate and is friction stirred to weld the plates together. The method appears limited to stir welding adjacent layers in order to form a welded assembly of discrete layers as opposed to forming large or bulk new MMC structures. Significantly, the ceramic layer and metallic layers remain discreet, and there is no stirring of ceramic particles to mix with the metal to form a MMC structure.

A further stirring method is disclosed in Chinese patent 107138960B which relates to a milling and stirring tool for particulate MMCs. This tool appears to be adapted for milling (i.e. removing) sections of a surface layer and which as a secondary operation is capable of friction stirring the surface of a workpiece (MMC). This disclosure therefore appears to be directed at milling or potentially improving the quality of a workpiece (MMC) at the surfaces. This disclosure does not appear to address existing problems of forming large or bulk new MMC structures. Significantly, this method only involves one workpiece (MMC) and does not relate to manufacturing of a new MMC structure.

In view of the above drawbacks with MMC liquid-state production and with existing friction stirring fabrication techniques, it is desirable to provide an alternative method for forming a metal matrix composite structure.

SUMMARY OF INVENTION

According to an aspect of the invention, there is provided a method for friction stir forming (FSF) a metal matrix composite (MMC) structure, the method including the steps of: providing a substrate comprising a metallic material and securing a preformed MMC layer comprising an MMC material in a position overlying at least a portion of the substrate; and friction stirring the preformed MMC layer with a friction stirring tool which includes a rotating probe, including locating the probe at a stirring depth at which the probe extends through the preformed MMC layer into a portion of the substrate and passing the tool through the preformed MMC layer at the stirring depth to friction stir the preformed MMC layer and integrate the preformed MMC layer with the substrate.

The invention advantageously employs a friction welding process to form a metal matrix composite structure whereby the preformed MMC layer is friction stirred to achieve a well-distributed reinforcement phase. The MMC layer can be stirred into a surface of the substrate to, firstly, integrate and bond the MMC layer with the metallic material of the substrate and, secondly, to simultaneously improve the properties of the preformed MMC layer via improved reinforcement phase distribution.

The invention involves an advantageous means of introducing reinforcement phase to the MMC structure. In particular, the use of a preformed MMC layer. The secured preformed MMC layer and substrate collectively provide a workpiece on which the subsequent friction stirring step is performed and the workpiece may be assembled relatively quickly and conveniently. In contrast to introducing loose or compacted wafers of ceramic powder, the use of a preformed MMC layer contains reinforcement phase which is already distributed within a metal matrix and is thereby already better dispersed as compared to pockets or grooves of concentrated power investigated in previous methods.

Furthermore, the pre-distribution of ceramic in the preformed MMC layer reduces the amount of wear on the stirring tool, as compared to stirring ceramic powder which is not contained in a matrix e.g. loose ceramic powder or pure ceramic structures. The present invention may reduce the amount of stirring energy required in that ceramic particulate is already pre-distributed within a metal matrix such that the stirring operation is not introducing ceramic to a matrix for the first time.

Furthermore, the use of a preformed MMC layer is advantageous as compared to in-situ MMC formation via material deposition as taught in U.S. Pat. No. 9,943,929. In particular, the present invention allows for use of a friction stirring tool thereby avoiding cost and complexity associated with deposition tools. Furthermore, the invention allows for the use of stir-cast preformed MMC layers having exceptionally high ceramic content and at relatively low cost. The stirring tool of the present invention includes a stirring probe which penetrates a portion of the substrate so as to integrate the MMC layer with the substrate, providing significantly improved adhesion as compared to U.S. Pat. No. 9,946,929 and allowing the creation of multi-layered or bulk MMC structures. Furthermore, the probe allows for use of a thicker MMC layer thereby increasing the volume of MMC material which can be integrated with the substrate during the FSF process.

The present invention is also advantageous as compared to MMC fabrication methods involving mixing of loose powder into grooves or holes cut into the substrate. Loose powder has relatively low pack density e.g. 60%. Producing an MMC material having a ceramic volume fraction to 30%-50% may therefore require cutting holes or grooves within the substrate through a very large proportion (around 50-83%) of the substrate which would render the matrix structurally unstable. Accordingly, these methods are generally not adapted for producing MMC material with high levels of reinforcement phase.

Depending on the initial quality of the preformed MMC layer which is used, the step of friction stirring the MMC layer can provide a considerable improvement in the material properties of the MMC layer. For example, the preformed MMC layer can be produced having relatively low quality (i.e. poor ceramic distribution). Enabling the use of a poor quality MMC layer is advantageous in that the preformed MMC layer can be produced at relatively low-cost via known and ubiquitous methods such as stir-casting. The poorly distributed MMC layer is subsequently friction stirred during the FSF process in which the poorly distributed ceramic particulate material is redistributed during swirling movement of the softened metal matrix around the friction stirring tool. This can improve the MMC microstructure and achieve a more uniform particle distribution, leading to improved material properties.

Furthermore, the step of friction stirring the MMC layer is considered to also improve the properties of the metal matrix, separate from the improved distribution of reinforcement phase particles. Primary (e.g. metal matrix) phase dendrites in bulk MMC produced by stir casting can typically be more than 50-100 μm in length. In contrast, MMCs according to the present invention can have primary phase dendrites less than 10 μm in length. The friction stirring step can thereby provide a significant refinement to the microstructure of the matrix phase of the MMC layer as well as improvement to the reinforcement phase distribution.

The use of a preformed MMC layer is further advantageous in that the reinforcement phase fraction can be desirably high. As discussed in the foregoing, stir-casting a high ceramic fraction MMC tends to result in unacceptable defects. The invention is able to utilise a high ceramic level MMC layer having poor distribution and which contains defects because these deficiencies are alleviated during friction stirring of the preformed MMC layer.

The stirring depth is such that the tip of the rotating probe extends into a portion of the substrate. In a particular form of the invention, the tip of the probe penetrates the substrate by approximately 1-3 mm, preferably approximately 2 mm, in the case of a 5 mm thick MMC layer. The probe is passed through an interface between the substrate and the MMC layer. Namely, an interface between an upwardly facing surface of the substrate and a downwardly facing surface of the MMC layer. The probe traverses along the interface so as to friction stir the interfacing surfaces into an integrated material and thereby bonding and integrating the metallic material of the substrate with the metallic matrix material of the preformed MMC layer.

Locating the stirring probe at the stirring depth in which the probe extends through the MMC layer may be achieved by penetrating a top surface of the MMC layer until the stirring depth is reached. Alternatively, in an embodiment of the invention in which the MMC layer is located in a recess within the substrate, the probe may first penetrate a surface of the substrate which is aligned with the top surface of the MMC layer and then traverse into the MMC layer in a generally horizontal direction.

According to a particular embodiment of the invention, the preformed MMC layer is relatively thin, although advantageously thicker than the coating applied in U.S. Pat. No. 9,943,929. In a particular example, the preformed MMC layer has a consistent thickness of between 4-5 mm. In alternative embodiments of the invention, the MMC layer thickness may be thicker. For example, the preformed MMC layer may be between 5-6 mm. In other alternative forms of the invention, even thicker preformed MMC layers might be used. For example, the preformed MMC layer might be >6 mm in thickness. With a sufficiently high-powered stirring machine and sufficient stirring tool strength, the present invention might be used with a preformed MMC layer of up to 10 mm. It will be appreciated that use of a thicker MMC layer may be desirable in order to construct a multi-layered MMC structure of predetermined size with as fewer layers as possible. This will be balanced with the capabilities and size of the stirring tool and the requirements of the particular application. The preformed MMC layer thickness may also be selected according to a particular microstructure which is sought to be achieved.

The MMC layer could have a slightly variable thickness. For example, the thickness of the MMC layer could vary within about 1 mm.

The preformed MMC layer could have a variety of shapes or configurations depending on the configuration of the MMC structure to be formed. The preformed MMC layer could comprise a plate, panel, film, slab, mesh, foil, leaf, ply, strip, wire, rod, bar or the like or a number of the foregoing packed together. According to a particular embodiment of the invention, the MMC layer comprises a sheet. In particular, a rigid sheet. For example, a planar sheet of MMC material. The MMC layer may comprise a unitary MMC body (for example a single sheet of MMC material) or the MMC layer may comprise several segments. The segments may be arranged to collectively form the MMC layer.

According to a particular embodiment of the invention, the preformed MMC layer has a planar configuration and comprises a plurality of preformed MMC sheets in an approximately co-planar arrangement so as collectively form the planar MMC layer. The provision of multiple segments as compared to a singular larger MMC layer may advantageously reduce internal stresses within the MMC layer and help to minimise defects.

The MMC layer can comprise a stir-cast rigid sheet. This embodiment of the invention is advantageous in that stir-casting techniques are well known and stir-cast material can be produced at relatively low cost. However, the preformed MMC layer could also be produced by a variety of alternative processes. For example, squeeze casting, powder blending and consolidation, spray deposition, vapor deposition, pack rolling and other known methods.

After its initial formation (e.g. after casting), the preformed MMC layer may undergo further processing prior to the FSF process in order to achieve a desired shape, configuration or other parameter. The preformed MMC layer may be machined. For example, an MMC sheet may be milled using a high-speed steel or a cemented carbide cutter to achieve a desired thickness. However, due to the high wear resistance of many MMC materials, the milling process can be generally slow and rapid tool wear is usually encountered.

An advantageous alternative to machining is to roll form the MMC layer prior to the FSF process. Hot rolling is desirably quicker than milling and may typically produce a smoother surface. According to an embodiment of the invention, a stir-cast MMC sheet is hot rolled to reduce its thickness. The hot rolling process could include heating the MMC layer and passing it through a rolling device. The hot rolling process could be repeated with successively closer rolling passes in order to achieve a desired thickness of the preformed MMC layer.

The preformed MMC layer could comprise a non-planar sheet. For example, a curved or otherwise non-planar sheet intended for use with a corresponding non-planar substrate. The MMC layer may be cast in a non-planar shape or may be roll formed, bended, press formed or otherwise processed to achieve a non-planar shape or a variety of other desired shapes, sizes or configurations.

The MMC layer may comprise a variety of MMC materials although the invention has been generally developed for applications involving discontinuous MMC i.e. MMC material in which the reinforcement phase comprises powder, particulate or short fibres. According to a particular embodiment of the invention, the MMC layer comprise a metal/ceramic MMC material. For example, the invention is suitable for use with a range of commonly used ceramic reinforcement particles such as silicon carbide, silicon dioxide, aluminium oxide, boron carbide, silicon nitride, boron nitride, titanium carbide, magnesium diboride, tantalum carbide, titanium boride (titanium diboride), tungsten carbide as well as fly ash or the like. The invention is suitable for use with reinforcement phase of various particle sizes. For example, the reinforcement phase may commonly comprise particle sizes of between 1-25 microns and, in particular, 10-25 microns. However, it is noted that the MMC layer of the present invention may include particles having a size <1 micron. It should be appreciated that a method of the present invention may also be performed using other types of MMC such as metal/metal MMC.

As discussed in the foregoing, the invention may be particularly useful in the formation of MMC structures having high ceramic volume fraction. However, it is to be appreciated that lower volume fractions are also possible and that the invention may still be advantageous as compared to existing techniques when forming low ceramic concentration MMC structures. According to a particular embodiment, the MMC layer comprises a metal/ceramic MMC material having a ceramic volume fraction of 20%-50%. More particularly, the MMC material may have a ceramic volume fraction of 25%-50%. In a particular embodiment, the MMC material has a ceramic volume fraction of 30%-50%.

In applications where the MMC layer is integrated with a non-MMC substrate (e.g. aluminium alloy) it will be appreciated that some ceramic material can cross the interface between the MMC layer and the substrate and thereby slightly reduce the ceramic volume fraction of the MMC layer. In applications where an MMC layer is integrated with another MMC layer having the same volume fraction, the resulting MMC structure will therefore have the same ceramic volume fraction as the constituent MMC layers.

The metallic substrate may be a non-composite metallic material. For example, the substrate may comprise an aluminium material, titanium material, magnesium material, nickel material, copper material, steel material or alloys thereof or combinations of these materials. According to a particular embodiment of the invention, the substrate comprises an aluminium material. In particular, an aluminium alloy.

In applications in which the substrate material is a non-composite material, the present invention provides a useful method of forming an MMC structure in which only a portion of the structure contains reinforcement phase. This is useful for componentry where MMC properties are required at only a portion or surface of the component. For example, a brake disc can be formed having a braking surface which is reinforced with ceramic particulate to cope with the heat and abrasion applied to the braking surface. Portions of the component other than the braking surface could advantageously be formed from an alternative material, as desired according to cost or preferred material properties for those portions of the component.

The invention thereby allows formation of an MMC structure having selectively located reinforcement phase distributed at a high quality. This may provide a significant cost saving over producing a bulk MMC component in which reinforcement phase is distributed throughout the component in order to achieve desired reinforcement at just a portion of the component.

Alternatively, the metallic substrate may comprise an MMC material i.e. the metallic substrate may itself be impregnated with a reinforcement phase. In this case, the FSF method according to the invention can integrate the MMC layer onto the MMC substrate. An MMC substrate could be a similar MMC material to the MMC layer or, alternatively, could be a dissimilar MMC material.

The method according to the invention can allow the additive manufacture of an MMC structure. For example, the method of the invention can be successively repeated to form large or bulk MMC structures. According to a particular embodiment of the invention, the method comprises the further step of securing an additional preformed MMC layer in a position overlying the MMC structure and integrating the additional MMC layer with the MMC structure using friction stirring to additively build the MMC structure in a desired configuration. The additional preformed MMC layer is secured onto the MMC structure formed according to a previous performance of the method according to the invention. The additional preformed MMC layer may be secured and stirred in the same manner as the initial preformed MMC layer was secured and stirred to the substrate.

In this manner, a bulk MMC structure can be produced via layer-by-layer construction. The invention may allow for a bulk MMC structure of similar material to be formed. The present invention may advantageously allow for the formation of an MMC structure in which both the substrate and the MMC layer are formed of relatively high-ceramic MMC material, for example >20% ceramic volume fraction.

Alternatively, an MMC structure with layers or portions of dissimilar MMC material. In a further alternative, an MMC structure can be formed having layers of MMC material interspersed with layers of non-MMC metallic material.

Accordingly, in an embodiment of the invention, the MMC structure formed by the invention is a bulk MMC structure as compared to so-called 'surface MMC' structures in which the MMC layer and/or the whole structure is <3 mm in thickness. Accordingly, in an embodiment of the invention, the MMC layer of the MMC structure may have a thickness of >3 mm. In particular, the MMC layer may have a thickness of greater than 4 mm and more particularly between 4 mm-6 mm.

It will be appreciated that these thicknesses relate to the thickness of a single MMC sheet which is friction stirred in a single FSF operation. The invention allows for construction of a larger MMC structure which may comprise numerous MMC layers applied with numerous FSF operations. In this case, the completed MMC structure may include an MMC portion formed from numerous MMC layers such that the MMC portion of the structure can have a thickness greater than the thickness of a single constituent MMC layer. For example, a MMC structure may be formed from five overlying MMC sheets having a thickness of 4 mm each by repeating the FSF method of the invention four times. The final MMC structure may therefore have an MMC thickness of 20 mm.

According to an embodiment of the invention, the stirring tool stirs substantially all of the MMC material in the preformed MMC layer. For example, the stirring tool can traverse along a path which encompasses the whole (or near to the whole) volume of the preformed MMC layer. This form of the invention is advantageous insofar as it is desirable for all parts of the preformed MMC layer to be stirred to achieve improved material properties. Furthermore, this form of the invention is advantageous in that the whole area of the underside of the preformed MMC layer is integrated (i.e. intermixed) with the underlying metallic material of the substrate. The form of the invention is also advantageous in that stirring substantially all of the MMC material can relocate defects toward a particular portion of the MMC structure for subsequent removal.

In one form of the invention, the stirring tool is passed along a predetermined tool path which encompasses the total area of the MMC layer. Although, it is noted that in certain applications, the MMC structure may be machined after formation and portions of the structure cut away. Accordingly, whilst it may be desirable in some applications for all of the MMC material in the finished component to have been stirred, there may be portions of the original MMC layer which are not included in the finished product and therefore these portions are not necessarily required to have undergone friction stirring. That is, the stirring tool may stir all of the MMC layer which is incorporated into the final product and substantially all (i.e. all but perhaps some portions intended for post-processing removal) of the original MMC sheet. In a particular form of the invention, the stirring tool stirs >80% of the MMC material in the preformed MMC layer. More particularly, the stirring tool may stir >90% of the MMC material in the preformed MMC layer. In a particular embodiment, the stirring tool stirs >95% of the MMC material in the preformed MMC layer.

It will be appreciated that the method of the present invention differs quite significantly from existing friction stir welding in that stir welding passes a stirring probe only along a weld line, typically a butt weld line. Consequentially, a stir welding tool is required to make only a single pass through the interface between the workpieces to be welded. In contrast, the present invention involves a significantly longer stir path because all or most of the MMC layer is being stirred. This increases the demand on the stirring tool due to heat accumulation in the workpiece and the longer stirring paths through highly abrasive MMC material.

The invention may involve novel stir paths which were not required or anticipated in existing stir welding processes. In this regard, an embodiment of the invention involves the stirring tool being passed through the MMC layer along an overlapping stir path. The stir path could be continuous. For example, the stir path could comprise an unbroken line such as a spiral. Alternatively, the stir path could be discontinuous. For example, the stir path could comprise a multi-pass stir path in which the tool is removed from and reinserted into the workpiece a number of times.

The overlapping stir path will typically pass the same region at least twice. The overlapping stir path can therefore overlap its own trail. The stir path could be curved. The stir path could comprise a linear multi-pass configuration comprising a number of parallel linear segments overlapping an adjacent segment. According to a particular embodiment, the stir path comprises a series of overlapping and discontinuous stir path segments. In particular, linear and parallel stir path segments.

At the completion of each linear segment, the tool may be withdrawn and return to its initial position before 'indexing' a predetermined distance in a direction perpendicular to the linear segments and typically in the direction of the unstirred workpiece. The predetermined indexing distance is desirably smaller than the diameter of a stirring tool shoulder (discussed in further detail below) in order to provide the necessary overlap. More particularly, the predetermined indexing distance may be typically similar or slightly less than the diameter of the stirring probe. This ensures that that stirring probe is passed through substantially all of the preformed MMC layer.

The stir path may extend along a linear segment from a starting side to a finishing side of the workpiece at which point the tool is withdrawn from the workpiece and returned to the starting side adjacent (and overlapping) the starting point of the previous segment. The tool could move relative to a static workpiece or the workpiece could be moved relative to a static tool. According to a particular embodiment of the invention, a computer numeral control (CNC) machine is used to control and/or program the stir path and to move the workpiece or the tool according to the stir path.

The stir path could follow a particular stir sequence in which various sections or parts of a workpiece are stirred in a particular order, timing, pattern, stir path configuration or other parameter. The stir path could be programmed to alter its passing speed, rotation, angle or other parameter in order to control or alter stirring performance at a particular location on the MMC structure. For example, an MMC layer could comprise several MMC segments of dissimilar MMC material and whereby each dissimilar material requires a variation of friction stirring tool parameters in order to optimise the stirring procedure. According to an embodiment of the invention, the stir path is configured such that the segments of a preformed MMC layer, for example separate MMC sheets, are stirred one-by-one according to a predetermined stirring sequence.

The stir path can be configured to relocate or repair defects present in the MMC layer or MMC structure. For example, the stir path can be configured to relocate or push defects to an edge of the MMC structure to facilitate subsequent removal via machining or similar process. Various defects can occur during friction stirring due to the (sometimes unpredictable) properties of the material flow. Examples of known defects include 'wormhole' or 'tunnel' defects which generally appear in the advancing (i.e. the yet to be stirred) side of the material and are thought to occur due to non-optimal heat input (too low or too high) and/or poor material flow.

The stir path according to the present invention can be configured such that a tunnel or wormhole defect, if formed, will be eventually pushed towards an outer edge of the workpiece where it can be conveniently machined away. According to an embodiment of the invention, the stir path includes overlapping stir passes which successively push a defect through the structure. For example, the stir path may include a series of overlapping stir passes which conclude at or adjacent to an edge of the structure. In this way, a defect might be moved to an edge region of the structure which it could be conveniently removed.

According to an embodiment of the invention, an interval between stirring tool passes is slightly smaller than the average diameter of the stirring probe. For example, a frustoconical stirring probe having a root diameter of 7 mm and a tip diameter of 5 mm may have an average diameter of 6.3 mm. The interval of stirring passes may therefore be set at <6.3 mm such that the stirring probe is passed through substantially all of the MMC layer and a tunnel or cavity formed in the workpiece will not be passed over by the stirring tool. Rather, the cavity defect will be continually pushed through the material in the direction of tool indexing (i.e. perpendicular to the tool pass direction) until it reaches an outer edge of the material.

The stir path may also be designed in order to minimise unbalanced heat distribution in the workpiece. In contrast to previous friction stirring applications where the tool is passed through only a small portion of a workpiece, the passing of the stirring tool through most or all of the MMC layer can cause heat built up within the workpiece which may lead to undesirable workpiece distortion. To alleviate this issue, in some applications, the stir path can be configured to reduce heat build-up. For example, a circular workpiece may be friction stirred quarter-by-quarter. That is, stirring (and therefore heat generation) may be localised to a particular region of the workpiece. This may allow for adequate heat removal from the stirring site via conduction to the non-stirred cooler regions of the workpiece. Heat build-up may further be managed by employing a stir path having a series of discontinuous segments which allows time for cooling when the stirring tool is withdrawn between segments.

Securing the preformed MMC layer to the substrate could be performed in a variety of ways. According to a particular embodiment of the invention, the preformed MMC layer is mechanically secured to the substrate. The preformed MMC layer can be secured to the substrate with at least one clamp. The MMC layer can be secured to the substrate with a plurality of clamps. The MMC layer could be adhered to the substrate via an adhesive. The MMC layer and substrate could be produced or provided with corresponding interlocking formations facilitating a mechanical interlock between the MMC layer and the substrate.

According to a particular embodiment of the invention, the preformed MMC layer is secured within a recess of the substrate. For example, a recess could be machined into a surface of the substrate. The recess could correspond to the shape of the MMC layer. For example, the MMC layer could be configured with a corresponding shape so as to fit snugly within the recess and be secured against side-to-side (e.g. horizontal) movement. The MMC layer could be sized to provide an interference or friction fit with the recess. The recess may be located in a surface of the substrate and have a size approximately equal to the side of the MMC layer such that the MMC layer, when fitted within the recess, is flush or level with the surface of the substrate.

It will be appreciated that the MMC layer, when located within a recess in the substrate, will overlie the portion of the substrate beneath the recess but need not necessarily overlie the entire substrate i.e. the portions of the substrate which are not beneath the recess.

According to an embodiment of the invention, the recess is machined into the substrate with a depth equal to the thickness of the MMC layer which may be approximately 4-5 mm. The provision of a relatively thin MMC layer can facilitate FSF operation because less material is required to be stirred with each pass of the stirring tool. As noted in the foregoing, the FSF process can be subsequently repeated with an additional preformed MMC layer if additional thickness is required.

The MMC layer preferably fits within the recess with minimal gap to the sides of the recess. Excessive gaps may encourage the formation of defects or cavities in the MMC structure. As noted in the foregoing, the MMC layer may comprise several segments which helps to reduce or manage internal stresses within the layer and thereby minimises defects. However, the gaps between segments may be desirably small to also minimise defects. One or more clamps may be fitted to secure the MMC layer within the recess i.e. secure the MMC layer against upward movement out of the recess.

This method of securing the MMC layer to the substrate may be particularly advantageous in reducing surface groove defects during the FSF process. Surface groove defects are considered to be influenced by the movement of the top sheet materials under the stress induced from friction stirring under high temperature. A surface defect of so-called 'groove defects' may tend to form in a location where there is a lack of material inflow. Therefore, it is recognised that controlling material flow of the top sheet during friction stirring may significantly reduce or alleviate surface groove defects. Locating the MMC layer within a recess of the substrate creates a perimeter boundary around the edge of the MMC layer which may help contain flow or stresses within the MMC layer and may desirably reduce instances of surface groove defect.

According to an embodiment of the invention, securing the MMC layer to the substrate comprises one or more initial passes of the friction stirring tool. The initial passes may therefore provide some initial adhesion between the MMC layer and the substrate and allowing the mechanical clamps to be subsequently removed. The location of the initial passes may be configured to optimally secure the MMC layer segments to the substrate and to one another. In some applications, it may be generally desirable for the number of initial passes to be limited so as to still allow a degree of movement between the MMC layer and the substrate, resulting in reduced internal stress and potentially repairing minor void defects. Excessive friction stirring initial passes for the purposes of securing the MMC layer can inhibit internal movement of the top sheet material.

According to a particular embodiment of the invention, the initial pass procedure involves two initial passes of the friction stirring tool for an area of 300-400 mm×300-400 mm square. The initial passes may be orientated in a variety of ways. In a particular form of the invention, initial passes performed on the same MMC sheet are parallel.

The method according to the present invention may comprise the further step of performing a surface finishing process to provide a finished surface on the MMC structure. The surface finishing process may comprise a milling process. The milling process may desirably provide a smoother surface on the MMC structure. In particular, the milling process may remove stirring formations (e.g. grooves or ripples) created in an upper surface of the stirred structure. The surface finishing process may be performed as a final step to improve the surface of the MMC component. In instances where the Friction Stir Forming (FSF) method of the present invention is repeated with additional MMC layers in order to additively construct a larger MMC structure, the surface finishing process can be performed after each stirring step. In this form of the invention, the additional MMC layer can be secured to the MMC structure in a position overlying (and/or located within a recess within) the finished surface.

The parameters of the stirring tool may be varied depending on the particular FSF application. However, according to a particular embodiment of the invention, the friction stirring tool has a travel speed of less than 200 mm/min. This relatively slow travel speed allows time for movement of material to occupy or push wormhole defects in a desired direction.

In a particular form of the invention, the friction stirring tool is rotated at less than 1000 rpm, preferably less than 800 rpm and preferably between 760 rpm to 780 rpm. This is to be contrasted with rotational speeds of 1000-2000 rpm typically used in friction stir welding. Reducing tool rotation speed can desirably lower heat generation which has been found to potentially reduce formation of internal wormhole defects.

The stirring tool may include a rotating shoulder in contact with the preformed MMC layer. The shoulder may comprise an annular surface surrounding the probe. The rotating shoulder includes a leading side which faces the tool pass direction and a trailing side opposite to the tool pass direction. It will be appreciated that the leading and trailing sides are not a static portion of the shoulder but rather are comprised of a moving surface and of whichever section of the rotating surface which is facing the leading or trailing direction.

As with friction stir welding, the function of the shoulder is to generate heat via friction with the workpiece surface. Furthermore, the shoulder can be used to control the dynamics or direction of material flow. For example, the stirring tool may be tilted toward the trailing side (i.e. tilted away from the direction of movement) in order to push or direct flowing material in the direction of the tool pass. In a typical application, the substrate and MMC will be orientated horizontally and with the stirring tool located overhead and having a central axis which is also the rotational axis of the rotating tool. The central axis may be tilted toward the trailing edge of the shoulder relative to vertical. The tilt may vary depending on the application and, in particular, on the shoulder-to-pin ratio of the tool. However, according to a particular embodiment of the invention, the stirring tool tilt is approximately 3° from vertical. That is, a central axis of the stirring tool is orientated approximately 87° relative to the surface of the horizontal workpiece upper surface.

The shoulder and probe may each have a known diameter. The ratio of the shoulder diameter to the maximum (i.e. the root) diameter of the probe is known as the shoulder-to-probe ratio or shoulder-to-pin ratio. In some applications, a larger shoulder can assist in closing the surface grooves produced during the stirring process. However, owing to the tool being tilted toward the trailing side, a larger shoulder will raise the height of the probe root relative to the work surface and therefore require a longer probe in order to penetrate the substrate. A longer probe increases mechanical load on the probe and increases the risk of mechanical failure during FSF operations.

Accordingly, an optimum shoulder-to-pin ratio range may be determined for a given application. In a particular embodiment of the invention, the ratio of the shoulder diameter to the probe root diameter is between 3:1 and 5:1. More particularly, this ratio is approximately 3:1. It will be appreciated that the probe 'root diameter' is the diameter of the probe taken from its root i.e. the portion of the probe at the connection between the probe and the insert. In embodiments of the invention where the probe is conical, frustoconical or otherwise tapered, it will be appreciated that the root diameter will also be the probe maximum diameter.

In friction stirring, the plunge depth is the depth to which the lowest point of the shoulder is plunged into the surface of the workpiece. Owing to the tilt toward the trailing side, the lowest point of the shoulder is the trailing edge of the shoulder. The plunge depth is one of the major factors influencing the movement of the flowing material during the stirring process. According to an embodiment of the invention, the plunge depth is between 0.4 mm to 0.6 mm into the surface of the MMC layer. That is, 0.4 mm to 0.6 mm below the level of the original (i.e. pre-stirred) surface of the MMC layer.

A relatively large plunge depth may reduce the formation of surface groove defects. The plunge depth may be increased mid-process for particular stir path configurations. For example, when performing a stirring pass which overlaps a previously stirred section that has been slightly depressed due to previous stirring passes, it may be necessary to increase the plunge depth in order to achieve optimum contact between the shoulder and the MMC layer.

The shoulder and probe may comprise discrete components connected together in an assembly. This configuration may advantageously allow for a probe to be replaced and for a shoulder to be reused. However, it may also allow for material to penetrate the interface between the discrete components. Accordingly, in a preferred embodiment of the invention, the shoulder and the probe are integrally formed in a unitary component. The unitary component is termed an 'insert' because the component is configured for receipt in a corresponding 'holder' of the friction stirring tool. The holder may include an opening or cavity for receiving the insert.

The probe of the insert may extend centrally from a generally annular shoulder surface. The annular shoulder surface may be slightly concaved or sunken such that the peripheral edge of the shoulder surface is lower than inner portions of the shoulder surface.

The probe may be cylindrical. Alternatively, the probe may have a tapered configuration for improved strength. The probe can have a conical or frustoconical configuration. The probe may have a triangular prism configuration.

According to a particular embodiment of the invention, the insert and the holder are configured to minimise heat transfer from the insert to the holder. This configuration advantageously reduces heat loss to the holder and thereby enhances heat at the interface between the rotating insert and the workpiece thereby promoting material flow and ceramic particle distribution during the stirring process.

Furthermore, reduced heat loss also facilitates a more uniform heat distribution within the insert and thereby reduces the likelihood of insert failure due to thermal stress. That is, failure due to one portion of the insert being significantly cooler than another portion which induces significant thermal stress within the insert. This problem is to some extent unique or at least amplified in the stirring process of the present invention in that previous friction stirring methods (for example, friction stir welding) do not typically involve multiple passes over the same work surface. The repeated and overlapping passes accumulate greater temperatures within the insert leading to increased thermal flux and a higher chance of failure due to thermal stress.

One means of limiting failure due to thermal stress is to provide a relatively small insert such that temperature is more uniform across the length of the insert. Another means is to configure the stirring tool to limit heat transfer from the insert to the holder. In this regard, a form of the invention includes a holder formed of a material having lower thermal-conductivity than the insert material. The holder may thereby act to some degree as a blanket which partially insulates the holder against excessive heat loss. In one configuration, the holder is formed of H13 steel and the insert is formed of tungsten carbide (WC). H13 steel typically has a thermal conductivity of approximately 24 w $m^{-1}k^{-1}$ and WC. typically has a significantly higher thermal conductivity of approximately 110 w $m^{-1}k^{-1}$.

The insert may be formed from an appropriately wear resistant material such as tungsten carbide (WC). In an alternative form of the invention, the insert may be formed of polycrystalline cubic boron nitride (PCBN) which is known for use in friction welding. However, PCBN is relatively brittle and may be unsuited for use in the present invention in which stirring paths are typically longer than stir welding. Furthermore, WC is typically less costly and easier to manufacture as compared to PCBN.

Another means by which the insert and holder can be configured to minimise heat loss is to minimise contact between the insert and the holder. In one form of the invention, the stirring tool includes a void within the holder which surrounds at least a portion of the insert. The void can provide an insulating 'air gap' around a section of the insert.

The insert can be mechanically connected to the holder by at least one removable fastener. In particular, the insert can be connected to the holder by at least one bolt. In a form of the invention, the insert is secured within the holder by a pair of bolts which engage with flat portions on the insert. The distal end of the bolts shanks may include a tapered tip to minimise the contact (and heat transfer) interface with the insert. A mechanical connection between the holder and insert is generally preferred to welding (e.g. brazing) the insert to the holder which causes undesirable heat loss into the holder. Furthermore, a mechanical connection facilitates convenient removal and replacement of the insert within the holder.

It will be appreciated that the high downward pressure applied on the workpiece by the stirring tool can induce undesirable distortion in the workpiece if the support system for the workpiece is inadequate. For example, it has been observed that for a circular substrate of 600-700 mm diameter and 20-30 cm thickness, the distortion between the centre and edge height can be in the unacceptable range of 5-15 mm.

In response to this problem, a particular form of the invention includes a sub-system for limiting distortion induced in the workpiece. The sub-system may include a support plate. In particular, the substrate can be removably secured to the support plate. The support plate may itself be removably secured to a work bench or CNC platform. The substrate may be bolted to the support plate. In a form of the invention, the support plate comprises an aluminium alloy plate. The aluminium plate may act as a thermal stabilizer to prevent or limit excessive thermal variation in the workpiece during FSF operation. It will be appreciated that excessive thermal variation may lead to thermal stress which can induce distortion within the workpiece. According to a particular embodiment of the invention, the substrate may include cooling channels or cooling fins which increase the surface area on an underside (or other surface) of the substrate to further enhance substrate cooling.

In the example of a circular substrate of 600-700 mm diameter, a square-shaped support plate of 800×800×50-100 mm may be suitable. The substrate may include bolt holes circumferentially located in an underside of the substrate. In a particular example, 24 bolts were used to secure a circular substrate to the support plate. The bolted workpiece and the support plate are then firmly clamped onto a FSF platform before the FSF operation commences. It has been observed during testing that distortion on the workpiece can be reduced to around 1.5 mm over a distance of 300-400 mm with the supporting system during the FSF process, as compared to 3-5 mm distortion when the supporting sub-system is not used.

The support plate may itself become warped or distorted after a FSF operation. To further reduce distortion in the workpiece, an embodiment of the invention further includes the step of inverting the distorted support plate after each FSF operation before bolting onto a substrate for the subsequent FSF operation. The pre-loaded internal tension within the distorted support plate is thought to further resist distortion in the workpiece during the next FSF operation.

According to another aspect of the invention, there is provided an MMC structure formed according to the method discussed above.

According to another aspect of the invention, there is provided a friction stirring tool for use in the method of the present invention. In particular, the friction stirring tool of the present invention may include the configuration, shape, dimensions or features herein discussed with reference to the method of the present invention.

According to another aspect of the invention, there is provided an MMC structure comprising a preformed MMC sheet integrated with an underlying metallic substrate. The MMC structure may be produced according to the above-discussed method and may therefore include any of the physical features hereinbefore discussed. Accordingly, in one form of this aspect of the invention, the MMC sheet is integrated with the substrate via friction stirring. In a particular form of the invention, an entire area of the substrate is integrated with the substrate.

According to a particular form of the invention, the MMC structure comprises a locomotive brake disc and the integrated MMC sheet defines a braking surface configured for contact with a brake pad.

Prior approaches for producing locomotive brake discs involve casting of the disc from iron or steel. In the past 5-10 years, there have been efforts to produce brake discs from aluminium metal matrix composite (AMMC) material in order to reduce brake disc weight. A previous method for producing an MMC disc brake involved stir-casting the entire structure with MMC material. In particular, current aluminium metal matrix composite (AMMC) brake discs are produced by, firstly, re-melting AMMC ingots with 20-25% SiC mixed in Al—Si alloy and, secondly, casting the molten AMMC into a mould to form the AMMC brake disc. This method is costly in that the ceramic reinforcement is indiscriminately located throughout the structure, including at regions where ceramic enhancement is not required. Furthermore, stir-cast MMC products tend to have poor or non-uniform ceramic distribution which can lead to sub-optimal performance.

It will be appreciated that this aspect of the present invention may therefore provide an improved locomotive brake disc component. In particular a brake disc which is improved in terms of its ceramic distribution as compared to stir-cast AMMC products. Moreover, the brake disc is improved in that MMC material can be selectively located at the braking surface of the product and for other portions of the product to remain unenhanced thereby reducing material consumption and cost.

It will be appreciated from the foregoing discussion, that the present invention provides flexibility in the ceramic particle species and volume fraction which can be used and allows for varying requirements for microstructure and mechanical properties. The invention is scalable insofar as being capable of producing various shapes and sizes of MMC structure. The method is tolerant to various interface conditions and is adaptable to a wide range of MMC layers with different reinforcement phase density and microstructures.

BRIEF DESCRIPTION OF DRAWINGS

In order that the invention may be more fully understood, an embodiment of the present invention will now be described with reference to the figures in which:

FIG. 10 is a top view of a particular friction stirring sequence performed by the friction stirring tool;

FIG. 11 is a top view of a portion of the workpiece which has been friction stirred;

FIG. 14 is a side view of a friction stirring tool according to an embodiment of the present invention;

FIG. 15 is a sectional view of the tool in FIG. 14;

FIG. 16 is a perspective view of a stirring tool insert of the stirring tool in FIGS. 14 and 15;

FIG. 17 is a sectional view of the tool insert in FIG. 16;

DETAILED DESCRIPTION

Figure 1:
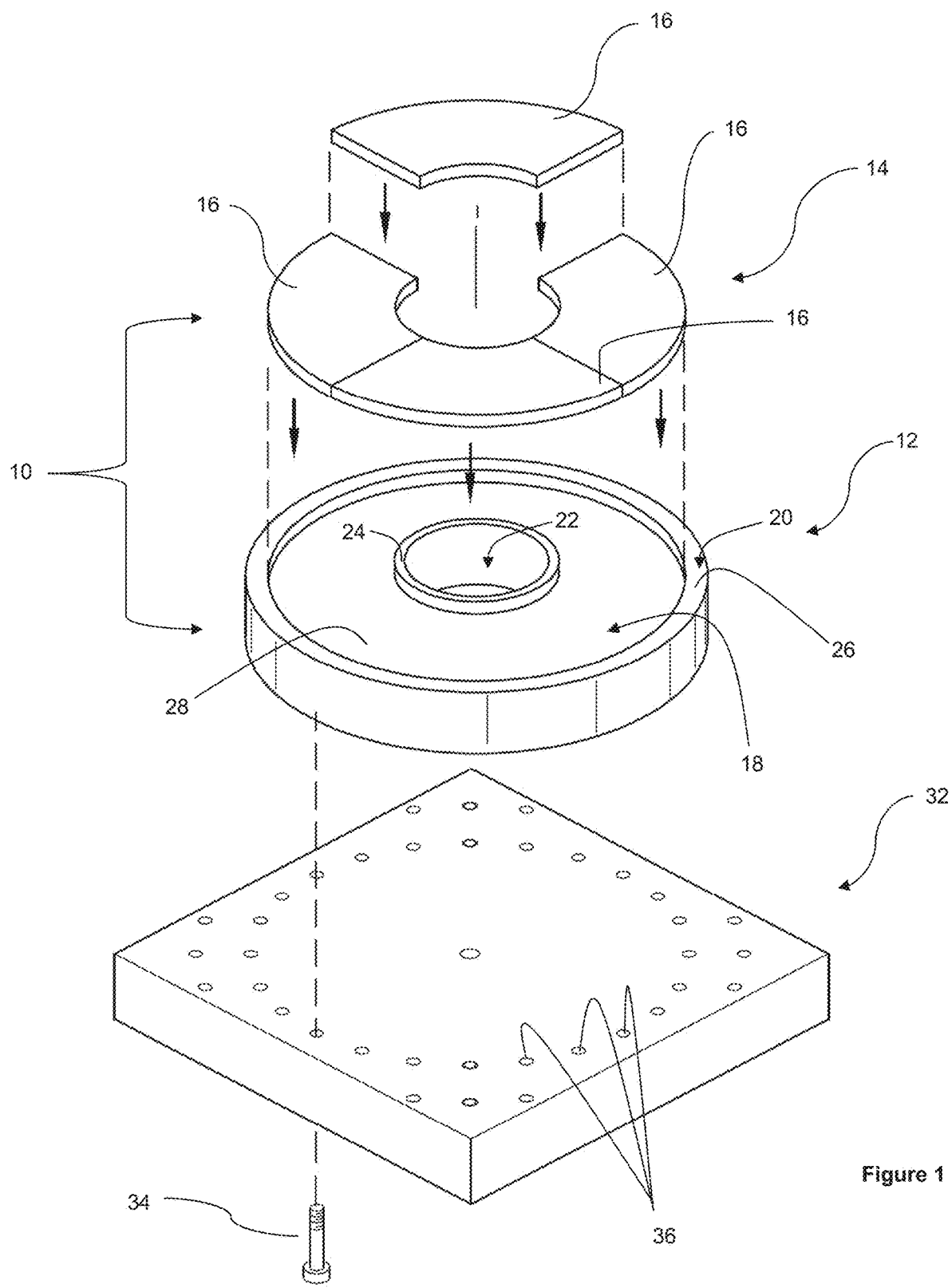
FIG. 1 is an exploded view of a workpiece comprising a preformed MMC layer and a substrate being secured to a support plate.

FIG. 1 illustrates an exploded view of a workpiece 10 comprising a substrate 12 and a preformed MMC layer 14. The workpiece 10 is mounted to a support plate 32 comprising a square sheet of aluminium alloy. The support plate 32 includes a series of twenty-four bolt openings 36 arranged in a circular configuration and corresponding to threaded openings (not shown) on the underside of the substrate 12. Bolts 34 extend from an underside of the support plate 32, through openings 36 and into the threaded openings in the underside of the substrate 12 in order to mount the substrate 12 to the support plate 32.

The substrate 12 is an annular disc of aluminium alloy having a central opening 22. An annular disc shaped recess 18 is machined into a top surface 20 of the substrate 12. The top surface 20 comprises an inner portion 24 surrounding the central opening 22 and an outer portion 26 surrounding the recess 18.

The preformed MMC layer 14 comprises four segments, each segment comprising a preformed MMC sheet 16 of MMC material, in particular AlSiC having a SiC content of >20% volume fraction, in particular approximately 25%. MMC sheets 16 are formed according to known methods of MMC production, for example stir-casting. To achieve a desired thickness, the stir-cast MMC sheets 16 may be roll-formed according to a rolling process which is outlined in Example 1 below.

The MMC sheets 16 have a quarter-annular disc shape such that the four segments collectively form an annular disc which corresponds in shape to the substrate recess 18.

Figure 2:
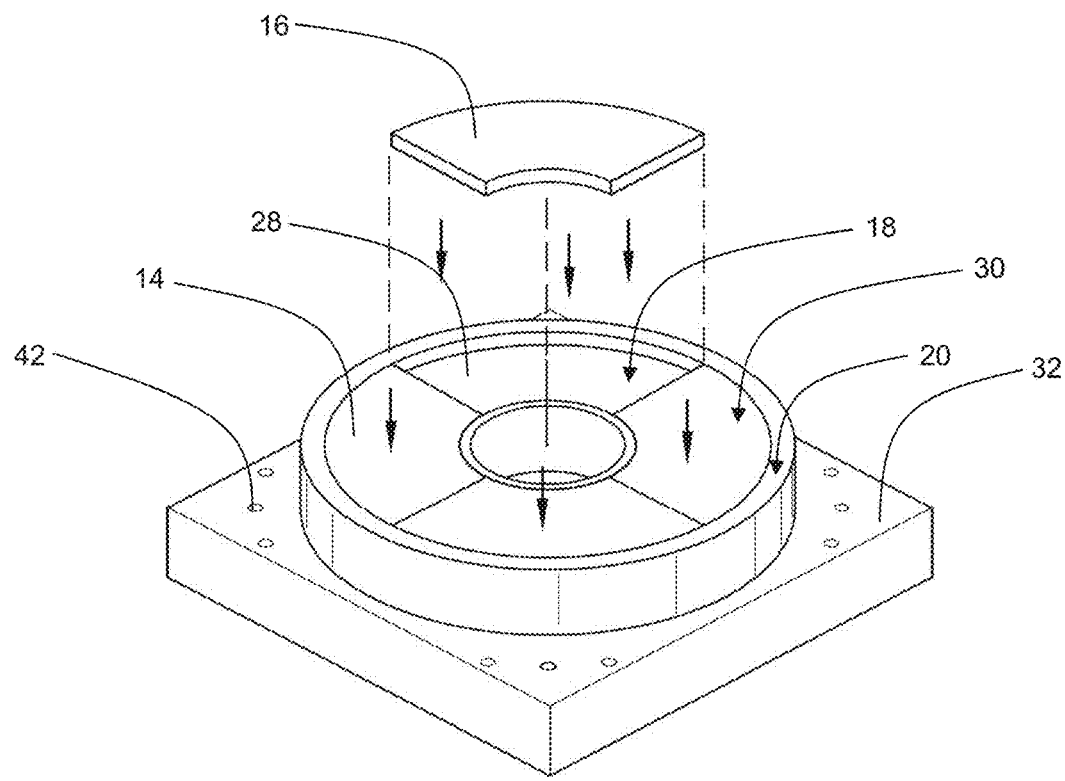
FIG. 2 is a partially-exploded view of the assembly in FIG. 1 in which the substrate is secured to the support plate and a final segment of the MMC layer is being located within a recess of the substrate.

With reference to FIG. 2, the MMC layer 14 is thereby locatable within the recess 18. The thickness of MMC layer 14 is approximately equal to the depth of the recess 18 such that an upper surface 30 of the MMC layer 14 approximately aligns with the top surface 20 of the substrate 12 when the MMC layer 14 is received within the recess 18.

FIG. 2 illustrates a final MMC sheet 16 being located within the recess 18 of the substrate 12 which is mounted to the support plate 32. The MMC sheets 16 are located upon an upward facing recessed surface 28. It will be appreciated from FIGS. 1 and 2 that the MMC layer 14 thereby overlies a portion of the substrate 12, in particular, the MMC layer 14 overlies recessed surface 28 of the substrate 12. The MMC layer 14 does not overlie the inner portion 24 and the outer portion 26 of the substrate top surface 20.

Figure 3:
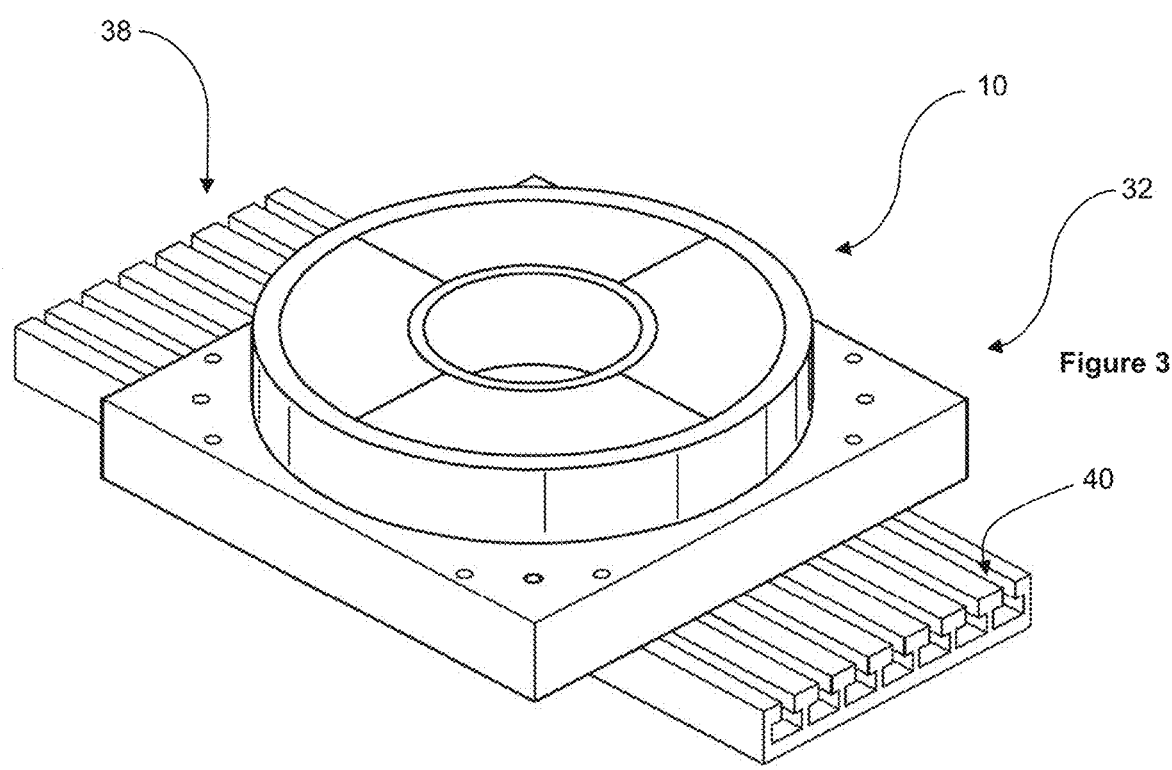
FIG. 3 is a view of the completed workpiece in FIGS. 1 and 2 and the support plate located on a work platform.

With reference to FIG. 3, the assembled workpiece 10 is shown mounted to the work support plate 32 which is located on a work platform 38 having a series of channels 40 configured for mounting a clamping system which will be discussed with reference to FIG. 4.

Figure 4:
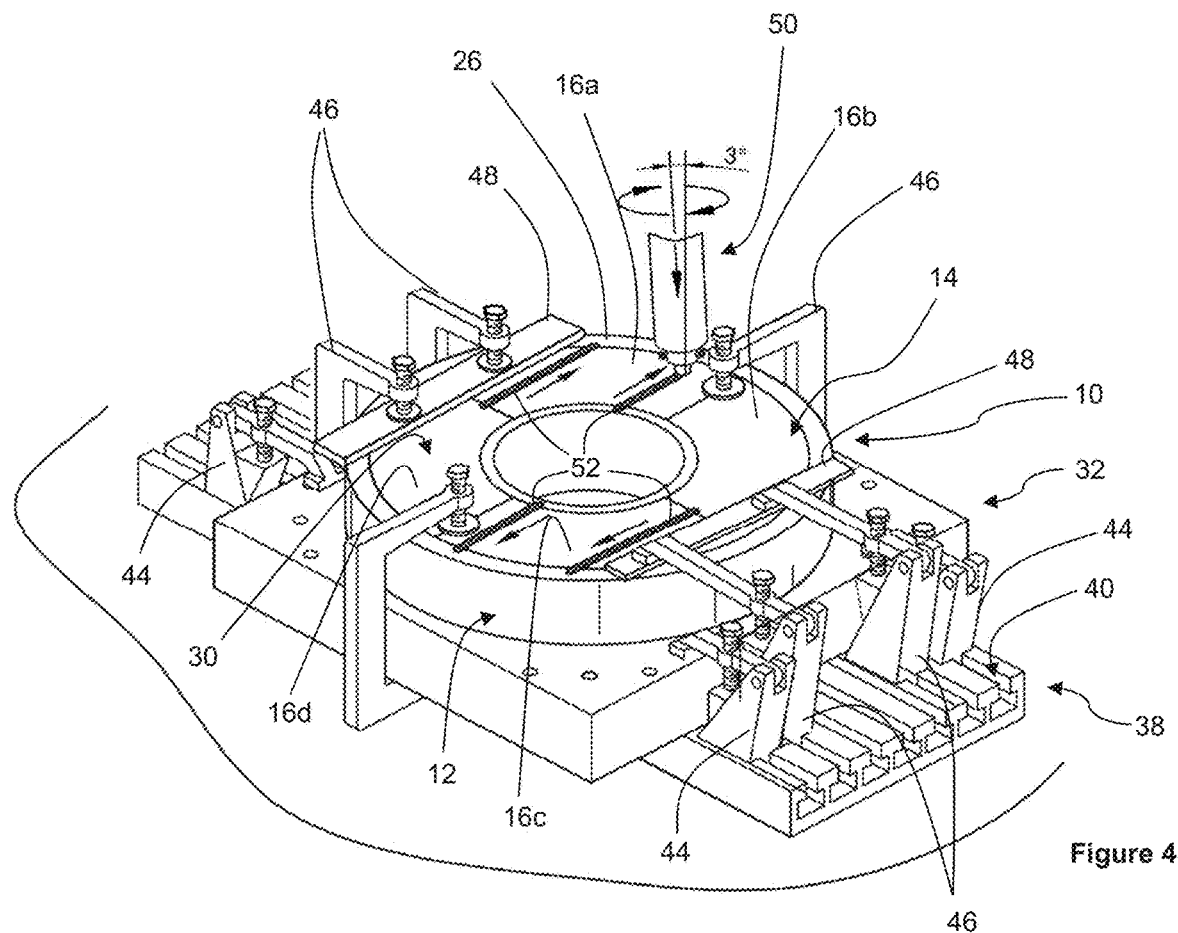
FIG. 4 is a view illustrating a mechanical clamping configuration and a friction stirring tool performing clamping stir-passes on the workpiece.

FIG. 4 illustrates a clamping arrangement comprising a number of clamps mounted to the channels 40 in work platform 38 for securing the workpiece 10 and the support plate 32 to the work platform 38. The clamps include four support plate clamps 44 which secure the support plate 32 to the platform 38 and six workpiece clamps 46 which clamp the MMC layer 14 to the substrate 12.

In particular, workpiece clamps 46 apply a clamping load onto the upper surface 30 of the MMC layer 14 to secure the MMC layer 14 against upward movement out of its position with the substrate recess 18. A pair of clamping bars 48 are clamped to the upper surface 30 of the MMC layer 14 via four of the six workpiece clamps 46. The clamping bars 48 extend across the upper surface 30 of the MMC layer 14 and extend also across the outer portion 26 of the substrate top surface. In this manner, the clamping bars 48 align the top surfaces of the MMC layer 14 and the substrate 12.

As labelled in FIG. 2, each corner of the support plate 32 includes a series of openings 42 which provide an alternative or additional mounting point for one or more clamps used during the friction stir forming (FSF) process.

Referring again to FIG. 4, a friction stirring tool 50 applies a series of initial stirring passes which comprise clamping passes 52 on the workpiece 10. The clamping passes 52 comprise linear segments and travel in a direction towards the outer diameter of the substrate 12. The clamping passes 52 provide an initial connection between the MMC layer 14 and the substrate 12 in order to allow removal of the workpiece clamps 46, as shown in FIG. 5.

As shown in FIG. 4, a first of the clamping bars 48 is located over MMC sheets 16a and 16d. The second of the clamping bars 48 is located over MMC sheets 16b and 16c. A pair of clamping passes 52 are performed on each of MMC sheets 16a and 16c in a direction parallel with clamping bars 48. The clamping bars 48 are subsequently relocated (not shown) by 90° such that a first clamping bar 48 is located over MMC sheets 16a and 16b and a second clamping bar 48 is located over MMC sheets 16c and 16d. A pair of clamping passes is then performed on each of MMC sheets 16b and 16d in an outwardly direction toward the perimeter of substrate 12, in the same manner as pair of clamping passes shown in FIG. 4 performed on MMC sheets 16a and 16c.

Figure 5:
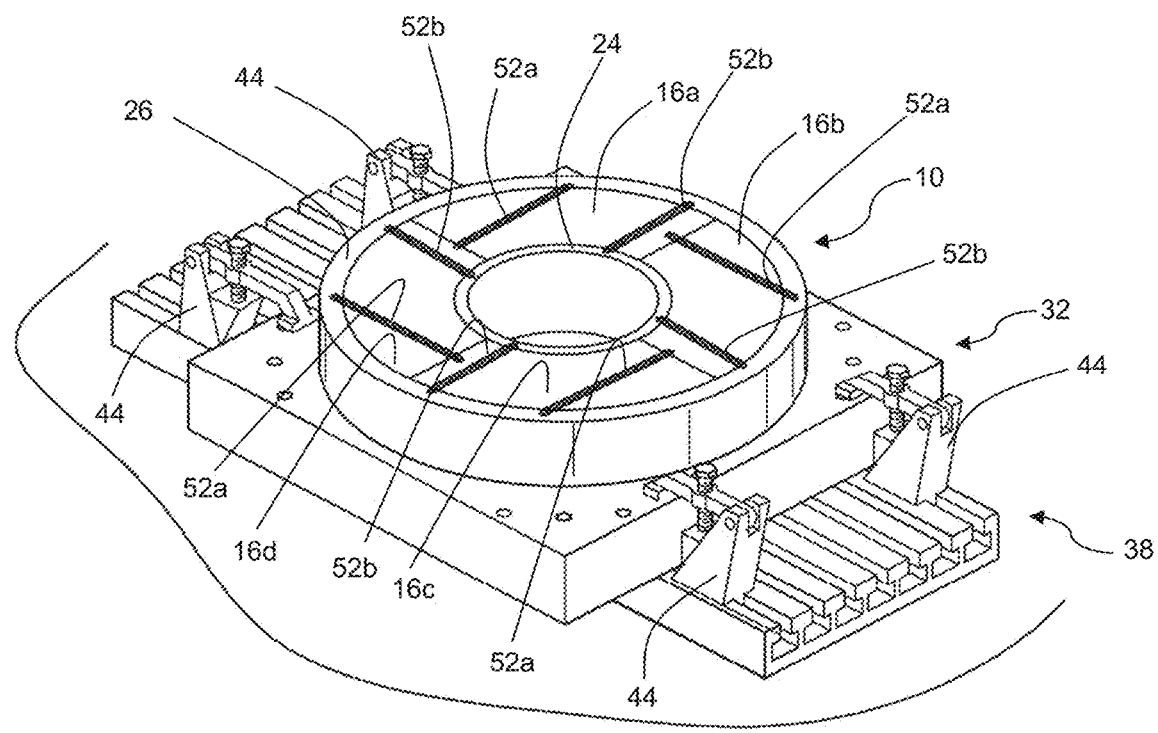
FIG. 5 is a view of the workpiece once the clamping passes are completed and the mechanical clamps are removed from the workpiece.

Turning to FIG. 5, the eight clamping passes 52 have been completed which have allowed for removal of the workpiece clamps 46. The support plate clamps 44 remain in position to secure the support plate (and the workpiece 10 which is mounted to the support plate) to the work platform 38.

The eight clamping passes 52 include a pair of parallel clamping passes comprising a first clamping pass 52a and a second clamping pass 52b performed on each of the four MMC sheets 16a, 16b, 16c, 16d. The pair of clamping passes 52a, 52b were performed in the same location on each of the sheets 16 such that each pair of clamping passes 52a, 52b is orientated 90° to the pair of clamping passes 52a, 52b performed on the adjacent sheet.

As shown in FIG. 5, the first clamping pass 52a commences at the edge of the adjacent MMC sheet 16, extends through the target MMC sheet 16 (i.e. the particular sheet which the pass is intended to clamp) and terminates in the outer portion 26 of the substrate top surface 20. The second clamping pass 52b is performed parallel to the first clamping pass 52a and commences in the substrate top surface inner portion 24, extends through the target MMC sheet 16 and terminates in the substrate top surface outer portion 26.

Turning briefly to FIG. 10, the clamping pass process is better illustrated and will be described with reference to MMC sheet 16c only. As previously noted, it will be appreciated that the clamping pass pattern is identical on each of the four MMC sheets 16. With reference to FIG. 10, the first clamping pass 52a is performed in the direction indicated by the adjacent dashed arrow. The first clamping pass 52a commencing in MMC sheet 16b which is adjacent to the target MMC sheet 16c. The first clamping pass extends through sheet 16c and terminates in the substrate top surface outer portion 26. The second clamping pass 52b is performed in the direction indicated by the adjacent dashed arrow. The second clamping pass commences in the substrate top surface inner portion 24, extends through the target sheet 16c and also terminates in the substrate top surface outer portion 26. It is noted that the first and second clamping passes 52a, 52b are titled 'first' and 'second' for convenience only and could be performed in either order.

The first clamping pass 52a thereby connects the target MMC sheet with an adjacent MMC sheet and with the underlying recessed surface 28 of the substrate (not shown) and also with the substrate top surface outer portion 26. The second clamping pass 52b thereby connects the target MMC sheet with the substrate top surface inner portion 24 and with the underlying recessed surface 28 of the substrate (not shown) and with the substrate top surface outer portion 26. This sequence is repeated for the remaining top sheets, as shown in FIGS. 5 and 10.

Figure 6:
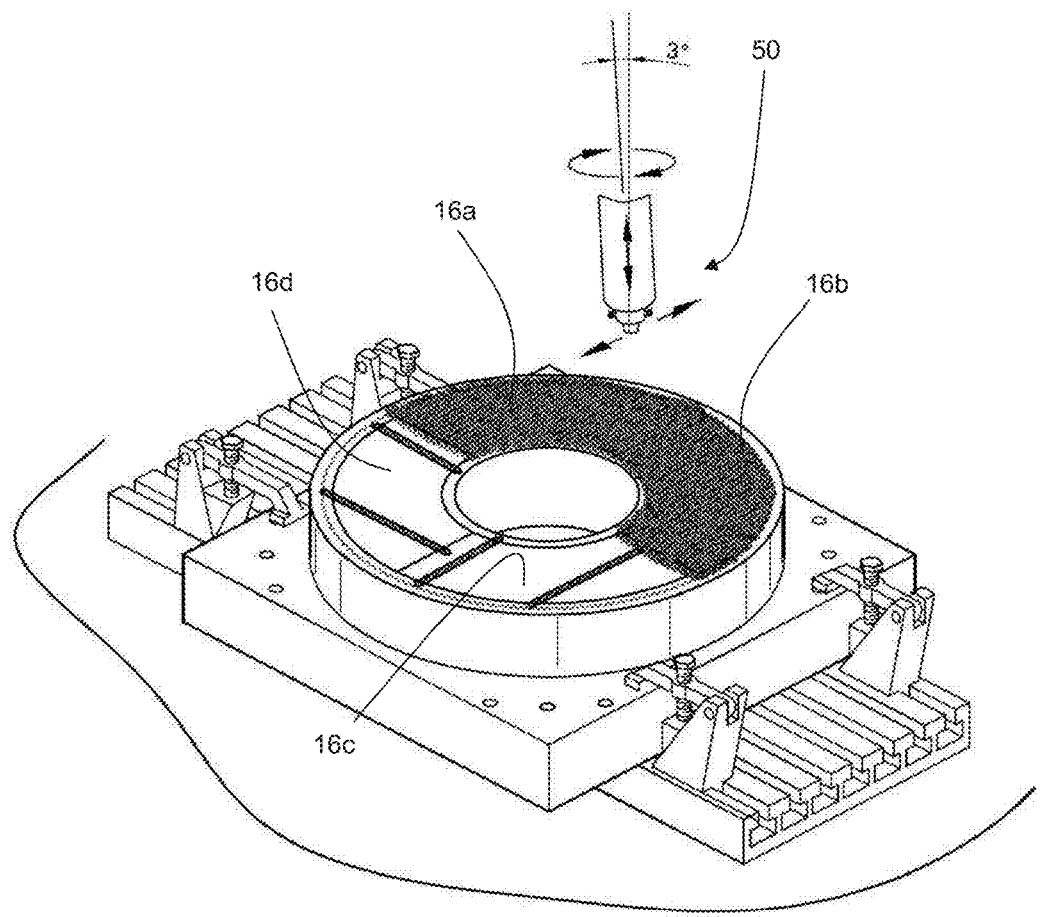
FIG. 6 is a view of the friction stirring tool part-way through performing a friction stirring process on the upper surface of the workpiece.
Figure 7:
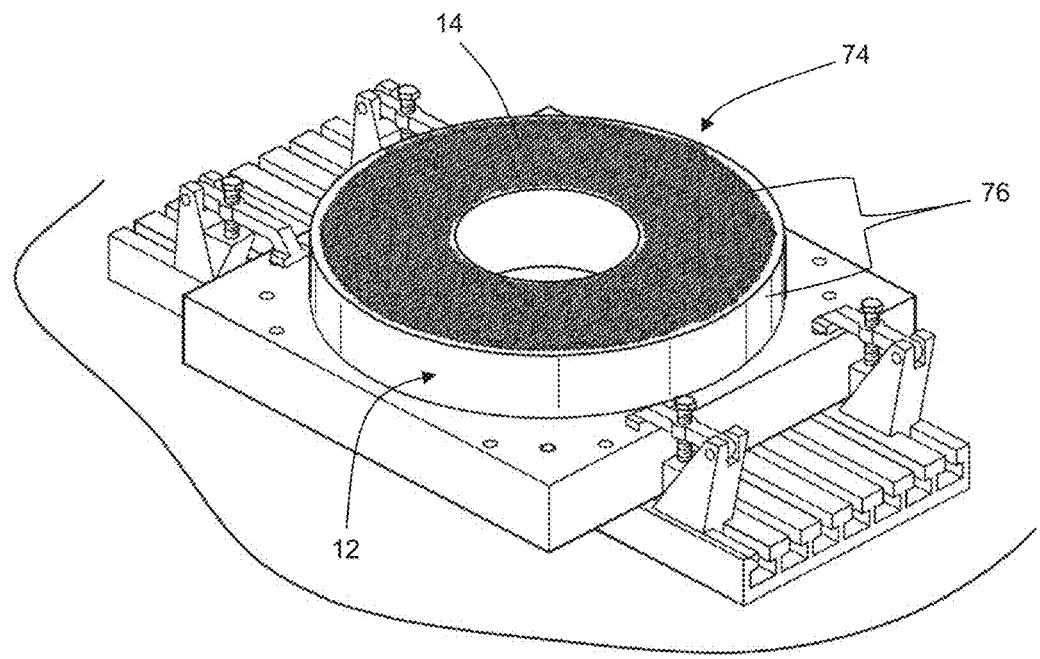
FIG. 7 is a view of the workpiece when the friction stirring process is completed.

Turning now to FIGS. 6 and 7, once the clamping passes are completed and the workpiece clamps are removed, a substantive friction stirring process is performed on workpiece 10. As shown in the exemplary embodiment in FIGS. 6 and 7, the friction stirring tool 50 is traversed across the whole area of each MMC sheet 16 in a sheet-by-sheet manner.

In the view shown in FIG. 6, stirring has been completed on sheets 16a and 16b, as indicated by the darkened region. Stirring will thereafter be performed on sheet 16c and then 16d. The first stirring pass performed on sheet 16c will overlap the ends of passes performed on sheet 16b.

In FIG. 7, the friction stirring process has performed across the whole MMC layer 14. All or substantially all of the volume of MMC material within MMC layer 14 has been contacted by the friction stirring tool 50 so as to redistribute and/or homogenise the SiC particulate dispersed throughout MMC sheets 16 as well as to integrate the sheets 16 with the substrate 12. The integrated substrate 12 and MMC layer 14 collectively define a new MMC structure 76.

Depending on the particular application, the stirred surface 74 of the MMC structure 76 may then be milled in a surface finishing process in order to achieve a smooth surface.

In an exemplary embodiment of the present invention, the completed MMC structure 76 comprises a locomotive brake disc which is mountable to a locomotive wheel. A surface finishing step is performed on the stirred surface 74 to produce a smooth braking surface. The braking surface is, in use, contacted by a locomotive brake pad within a brake assembly to apply a frictional braking force onto the brake disc in order to slow rotation of the locomotive wheel.

The ceramic-infused MMC braking surface is advantageously enhanced against abrasion and heat generated during the braking process. Furthermore, the brake disc is formed such that the MMC enhanced portion of the structure is localised at the braking surface. Portions of the brake disc not intended for frictional contact with the brake pad (and therefore not requiring MMC enhancement) are comprised of aluminium alloy. In this manner, the MMC regions of the MMC structure are selectively located in order to reduce cost.

With reference now to FIGS. 8 to 13, the friction stirring process will now be described in further detail.

Figure 8:
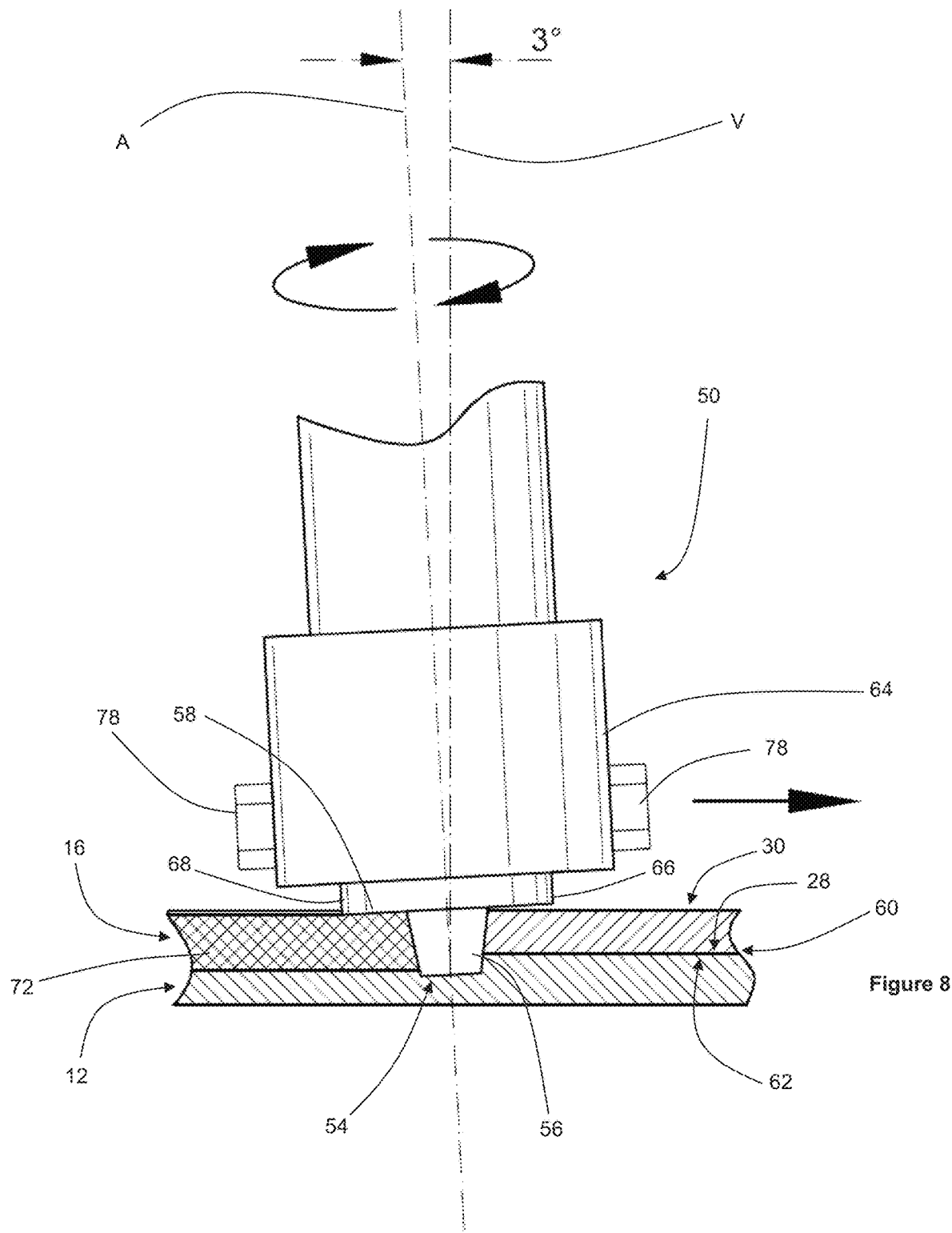
FIG. 8 is a side and partially-sectional view of the friction stirring tool performing a friction stirring process on the workpiece.

FIG. 8 illustrates a sectional view of the friction stirring tool 50 stirring one of the MMC sheets 16 of MMC layer 14. The friction stirring tool 50 comprises a rotating insert 54 which includes a frustoconical rotating probe 56 and a rotating circular shoulder 58. The insert 54 is secured within (and extends outwardly from) a holder 64. The insert 54 is secured in the holder 64 by a pair of removable fasteners which comprise bolts 78 that will be discussed in further detail below.

The probe 56 is shown at a stirring depth in which the probe 56 extends through the MMC sheet 16 and into a portion of the substrate 12 which underlies the sheet 16. The probe 56 is passed through the MMC sheet 16 in the direction indicated.

The probe 56 is passed through the MMC sheet 16 to friction stir the MMC material of the MMC sheet 16 thereby redistributing the ceramic particulate dispersed through the MMC sheet. Furthermore, the probe 56 is passed through the interface 60 of the substrate 12 and the MMC sheet 16 to thereby integrate the MMC sheet 16 with the substrate 12. The interface 60 comprises the interface of the MMC sheet underside 62 and the recessed surface 28 in substrate 12.

The shoulder 58 includes a leading side 66 which faces the direction of tool movement and a trailing side 66 on the opposing side of the shoulder 58 and facing a stirred region 72 in the trail of the probe 56. The stirring tool 50 has a central axis A along which aligns with a central axis of the probe 56. The central axis A is therefore also a rotational axis of the rotating insert 54. The central axis A is tilted at approximately 3°, relative to a vertical axis V, toward the trailing side 68 of the shoulder 58. The trailing side 68 is therefore positioned slightly lower than the leading side 66.

The stirring tool 50 is positioned relative to the MMC sheet 16 such that the trailing side 68 is plunged into the upper surface 30 of the MMC sheet 16 by a predetermined 'plunge depth'. In a particular embodiment of the invention, a plunge depth of between 0.4 mm to 0.6 mm is used. The tilted orientation of the shoulder 58 causes flowing material to be, to some degree, pushed or urged forward in the direction of tool movement.

Figure 9:
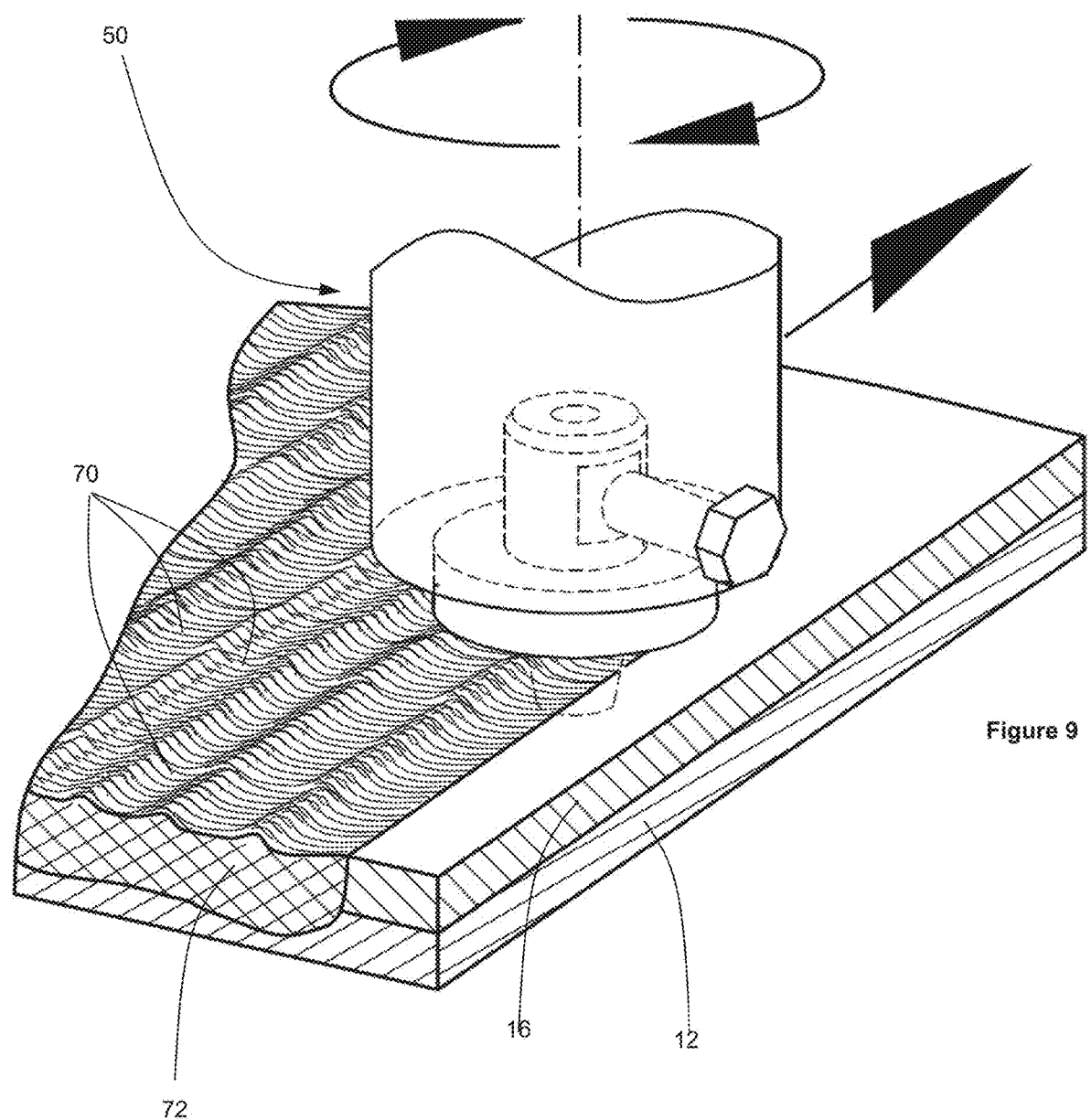
FIG. 9 is a perspective view of the friction stirring process performed in the preceding figures.

Turning to FIG. 9, the stirring tool 50 is shown performing a series of overlapping, parallel and linear stir passes 70. The stir passes 70 are segments of a predetermined stir path along which the stirring tool 50 is passed through the MMC sheet 16. The stir path will be discussed in further detail below with references to FIGS. 10 and 11.

The stir path is designed prior to commencement of the friction stirring process and may vary depending on the shape or configuration of the MMC structure being formed. In the illustrated embodiment of the invention, the MMC structure being formed is the circular disc MMC structure 76 shown in FIG. 7. The stir path was determined on the basis of this structure and on the basis of the MMC layer 14 configuration. In particular, the stir path was designed in view of the MMC layer 14 being segmented into the four MMC quarter sheets 16. A sheet-by-sheet stir path was found to be suitable for stirring this particular segmented MMC layer configuration wherein stirring of each sheet 16 is completed before stirring of the subsequent sheet 16 is commenced. This stir path is advantageous in that heat is localised to one section (i.e. approximately one quarter) of the workpiece 10 and allowing for heat dissipation via conduction to the other (cooler) quarters of the workpiece 10. Reduction in overall workpiece heat may be desirable, particularly with aluminium workpieces, in that it can avoid or alleviate workpiece distortion.

It will be appreciated that alternative MMC structures having a different configuration (particularly a different MMC layer configuration) may not necessarily be stirred according to the same stir path. For example, an MMC layer or substrate of different material with different heat-generating and/or heat-conducting properties may be better stirred by a stir path which passes through a larger area of the MMC structure before returning to overlap the starting region.

Turning now to FIGS. 10 and 11, the stir path of the present invention will be discussed in further detail.

FIG. 10 illustrates a top view of workpiece 10 and provides a diagram of the stir path to be taken by the stirring tool. FIG. 10 illustrates MMC sheet 16a having been already stirred as indicated by the darkened region. The stir path will be described with reference to sheet 16b however it will be appreciated that the stir path follows the same pattern for each MMC sheet 16.

The first stir pass is performed along the interface of MMC sheets 16a and 16b as indicated by arrow 70a. The first stir pass 70a will typically overlap with the termination ends of the stir passes which were made through sheet 16a in a left-to-right direction when viewing the perspective in FIG. 10. The first stir pass 70a in sheet 16b therefore passes the stirring tool through a region of the workpiece 10 which has already been stirred during the previous stirring of sheet 16a.

At the conclusion of each stir pass 70 through MMC sheet 16b, the stirring tool is indexed to the right as indicated by arrow 80. The location and orientation of the second, third and fourth stirring passes are generally indicated by arrows 70b, 70c, 70d. Although it should be appreciated that these arrows are positioned for illustrative purposes only and in practice the passes are more tightly positioned so as to substantially overlap with the preceding pass.

Each of the stir passes 70 approximately commence in the outer portion 26 of the substrate top surface 20. Initially, the passes 70 terminate in the inner portion of the substrate top surface 24. Once the stirring tool 50 has indexed beyond the right-hand side of top surface 24, the passes 70 will terminate at the interface between MMC sheet 16b and MMC sheet 16c. The commencement and termination points of each stir pass 70 are predetermined and programmed into a CNC machine which controls relative movement between the stirring tool 50 and workpiece 10.

The relative movement between the stirring tool 50 and the workpiece 10 may be performed with movable stirring tool which is moved relative to a static workpiece. Alternatively, the relative movement may involve a movable workpiece (for example on a movable work platform) which is moved relative to a static stirring tool.

FIG. 11 illustrates an example of overlapping stir passes 71 performed on MMC sheet 16c. The passes 71 are performed in the same pattern as described above with reference to MMC sheet 16b. The passes 71 in FIG. 11 made to MMC sheet 16c are performed according to the pass arrows and indexing arrows shown with reference to MMC sheet 16c in FIG. 10. Returning to FIG. 11, an initial pass 71a is performed at the top of FIG. 11 and subsequent parallel and linear passes performed are performed wherein each subsequent pass overlaps the preceding pass. The passes 71 are performed according to an indexing direction moving toward the bottom of FIG. 11. The final pass 71z through MMC sheet 16c is indicated at the bottom of FIG. 11.

The indexing distance may vary according to various parameters including stirring tool configuration and the thickness or material of the sheet being stirred. However, in the illustrated embodiment, the indexing amount was approximately between 4.5 mm-6 mm. It is noted that a smaller indexing amount (i.e. a larger overlap between subsequent stirring passes) may in some applications provide a desirable improvement in material mixing but at the cost of reduced productivity (i.e. increased stirring time). Accordingly, a preferred indexing amount may be selected on the basis of material requirements, mixing requirements and time/productivity requirements.

It will be appreciated from FIGS. 10 and 11 that the overlapping stir path therefore covers substantially all of the material in the MMC layer 14. That is, the indexing amount is less than the width of the stirred region created by each stirring pass. The stirring tool thereby passes through volume regions of the workpiece 10 repeatedly and with sufficient proximity between each pass such that defects tend to be pushed toward the advancing side i.e. in the direction of indexing. For example, a wormhole defect (i.e. a cavity) appearing in MMC sheet 16c would tend to be pushed or moved by each sequential pass 71 and toward the bottom of FIG. 11. The final pass 71z may urge the defect into the outer periphery of the substrate 12 where it might be conveniently removed via machining in a post-forming process.

The overlapping stir path segments 71 illustrated in FIG. 11 are discontinuous in that the stirring tool is repeatedly inserted and withdrawn from the workpiece 10. However, it will be appreciated that alternative applications of the invention may involve a continuous stir path which does not comprise a plurality of discrete segments. For example, a continuous spiralling stir path which commences at the centre of a workpiece and spirals outward, overlapping itself and still pushing defects towards the workpiece perimeter. In another example, the stir path may comprise a zig-zag configuration or a snaking configuration which includes linear segments connected by turns and performed in a continuous/uninterrupted path.

Figure 12:
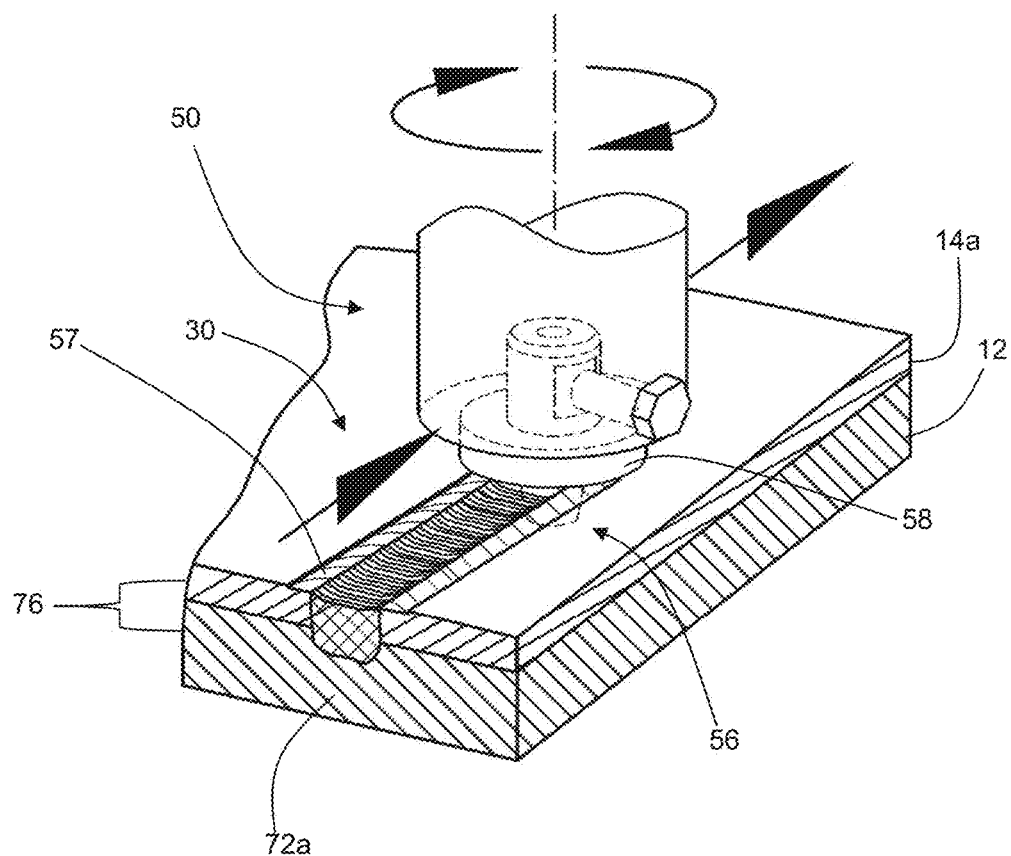
FIG. 12 is a view of the friction stirring process performed on a first MMC layer overlying a substrate.
Figure 13:
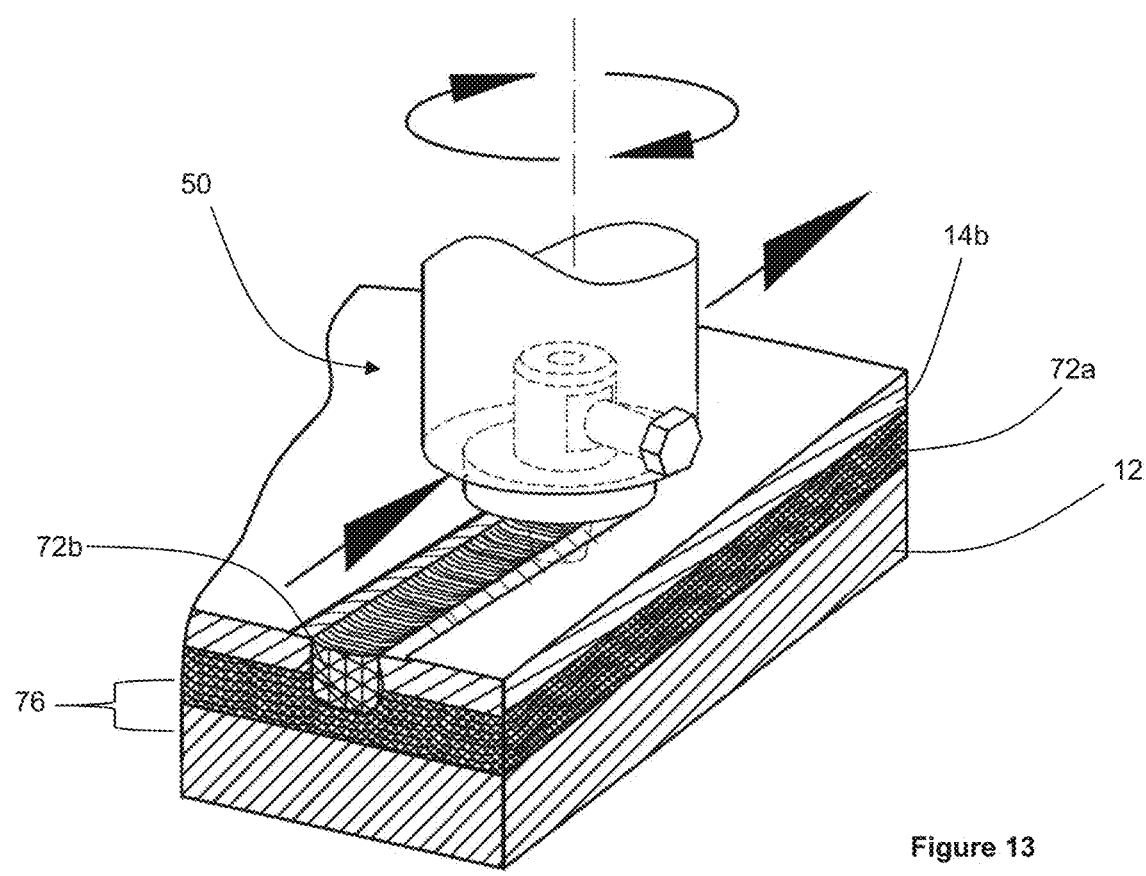
FIG. 13 is a view of a friction stirring process performed on an additional MMC layer overlying a previously stirred MMC layer to additively form a bulk MMC structure.

FIG. 12 illustrates a stirring pass performed through a first preformed MMC layer 14a which is secured in a position overlying a substrate 12. A stirred region 72a is shown in the trail of the probe 56 and a shoulder indent 57 is shown in the trail of the shoulder 58. The shoulder indent 57 is formed in the upper surface 30 of the first MMC layer 14a. Once stirring of the first MMC layer 14a is completed, the substrate 12 and first MMC layer 14a will define an MMC structure 76 formed via the FSF process of the present invention. As best shown in FIG. 13, MMC structure 76 comprises substrate 12 and the stirred region 72a. The stirred region 72a comprises an upper portion of substrate 12 stirred together with the first preformed MMC layer 14a.

FIG. 13 illustrates the FSF process of the present invention and of FIG. 12 when repeated on an additional MMC layer 14b in order to additively (i.e. layer-by-layer) enlarge MMC structure 76. The repeated FSF process is outlined as follows.

Once formation of MMC structure 76 in FIG. 12 is completed and the stirred region 72a has cooled, a surface finishing process (e.g. milling) is performed to achieve a smooth surface on the upper surface 30. For example, to smooth indentations or stirring flashes such as shoulder indentation 57. As shown in FIG. 13, a second MMC layer 14b is then overlaid and secured onto MMC structure 76. As shown in FIG. 13, the second MMC layer 14b is stirred to integrate the second MMC layer 14b with the MMC structure 76.

In this manner, the MMC structure 76 may comprise the 'substrate' for the subsequent FSF process which is repeated using the second MMC layer 14b. The FSF process of the present invention can be repeated indefinitely to construct a larger MMC structure. The substrate 12 might comprise an existing metallic component which is desired for an MMC surface treatment or coating. The additional MMC layer 14b may be located in a pocket or recess in the MMC structure (for example machined into the upper surface 30) in the same manner that the first MMC layer 14 is located in the recess 18 of the substrate 12, as shown in FIGS. 1 and 2.

It is noted that, in FIGS. 9, 12 and 13, only a single bolt is shown for convenience of illustration. However, the preferred embodiment of the stirring tool 50 includes a pair opposing bolts 78 (as shown in FIGS. 8, 14 and 15).

Turning now to FIGS. 14-17, the stirring tool insert 54 and holder 64 will be discussed in further detail.

FIG. 14 is a side view of the stirring tool 50 which includes the holder 64, bolts 78 and the insert 54 which protrudes outwardly from an underside 84 of holder 64. A downwardly-facing annular shoulder surface 59 is located on the underside of the shoulder 58. The probe 56 extends centrally from the shoulder surface 59. As shown in FIG. 15, the downwardly-facing shoulder surface 59 is sunken or recessed towards its centre such that the perimeter of the surface 59 is, in use, lower and closer to the workpiece than the inner portion of the surface 59.

The probe 56 has a frustoconical profile for improved strength. According to a preferred embodiment of the invention, the frustoconical probe 56 has a tapering angle (i.e. the angle of the tapered sidewall relative to a central axis of the insert 54) of between 10° to 20° to improve mechanical strength and reduce the possibility of failure (i.e. break-up) at the connection of the probe 56 and the shoulder 58. The angle of 10° to 20° is significantly larger than what is typically used in previous friction stirring processes which is normally 2°-3°. The probe 56 is therefore more 'pointed' than conventional stirring probes and has a larger ratio of root diameter to tip diameter. As noted in the foregoing, previous stirring processes typically involve shorter stir paths and/or stir less abrasive material which involve lower thermal and mechanical demands on the stirring probe.

FIG. 15 illustrates the engagement between the insert 54 and the holder 64. Insert 54 includes a cylindrical stem 90 received within a cavity 86 in the holder 64. Due to the pressure involved in friction stirring processes as well as thermal expansion of materials, after an FSF process is completed, the insert 54 may in some cases remain secured within the cavity 86 (e.g. by friction or interference fit) even when bolts 78 have been removed. The holder 64 includes a central opening 88 extending to cavity 86 and can assist with removal of the insert 54 from the cavity 86 by pushing a rod or other elongate object through opening 88 and urging the insert 54 to separate and remove it the cavity 86.

The insert stem 90 includes a pair of flat portions 92 on opposing sides of the stem 90. Only one of the flat portions 92 is shown in the perspective in FIG. 16. As shown in FIG. 15, bolts 78 include bolt shanks 97 which contact the flat portions 92. Bolts 78 are threaded through opposing sides of the insert 54 such that the bolts 78 may be tightened onto the flat portions 92 to secure the stem 90 within the cavity 86 and thereby secure the insert 54 within holder 64

The shoulder 58 is seated within a corresponding recess 95 in the underside 84 of the holder 64. The recess 95 is located at a mouth on the lower side of cavity 86. As shown in FIGS. 15 and 16, the insert 54 includes an upwardly-facing annular surface 94 on the opposite side of the shoulder 58 from the downwardly-facing surface 59. The upwardly-facing annular surface operates as a loading surface 94 through which load from the holder 64 is applied onto the insert 54 during a friction stirring process. In particular, the upwardly-facing loading surface 94 of the insert 54 is abutted by an annular downwardly-facing loading surface 96 on the holder 64 which is shown in FIG. 15.

The stirring tool 50 is configured to minimise heat loss from the insert 54 to the holder 64. In particular, insert 54 is formed of tungsten carbide (WC) and the holder 64 is formed of H13 steel which has a lower thermal-conductivity as compared to tungsten carbide. The material selection thereby minimises heat absorption by the holder 64 from the relatively hot insert 54.

The stirring tool 50 is further configured to minimise heat transfer between the holder 64 and insert 54 via the mechanical engagement between the two components. The stirring tool 50 is configured such that the only points of contact between the insert 54 and the holder 64 is, firstly, the contact between the shoulder 58 with the recess 95 and, secondly, the flat portions 92 of the insert contacting the bolt shanks 97 of the holder 64.

The stirring tool 50 is further configured to minimise heat transfer between the holder 64 and the insert 54 via the provision of an air gap surrounding a portion of the stem 90. As shown in FIG. 15, the cavity 86 has a slightly larger diameter (and is slightly longer) than the stem 90. Consequentially, an air void 98 surrounds substantially all of the surface area of the stem 90. In particular, the air void 98 surrounds all of the stem 90 other than pair of contact areas between flat portions 92 with bolt shanks 97. Furthermore, the flat portions 92 enlarge the volume of the air void 98 between the sides of the stem 90 from the sides of the cavity 86 and thereby increases the desirable insulating effect.

Turning now to FIG. 17, the specific configuration of the insert 54 will be discussed in further detail with reference to the following dimensional definitions. As shown, the probe 56 includes a tip diameter d1 and a root diameter d4, the shoulder 58 has a diameter d2 and the stem 90 has a diameter d3. The probe 56 has a length h1, the shoulder 58 has a thickness h2 and the stem 90 has a length h3.

According to a particular embodiment of the invention, the length h1 of the probe 56 is approximately equal to the height/thickness h2 of the shoulder 58. This provides an advantageous balancing of the force/resistance on the probe 56 and shoulder 58 whilst minimising the volume of the insert 54 to reduce heat loss and thereby improve mixing of ceramic powders in the metal matrix and reduce void defects.

A relatively small (smaller than conventional stirring tools) ratio between the probe tip diameter d1 and the shoulder diameter d2 may be used. For example, a ratio of 1:5 or less. As such, a larger shoulder diameter d2 may be preferred for minimising surface defects such as surface grooves and improving the mixing of ceramic powders in the metal matrix between the multiple FSF passes. In a particular form of the invention, the d1:d2 ratio is between 1:3 to 1:5 and may be selected on the basis of surface defect level for a given material.

The diameter d3 of the stem 90 may preferably be slightly larger than the root diameter d4 of the probe 56 so as to provide sufficient strength. For example, a stem diameter d3 may be 12-14 mm for a probe 56 root diameter d4 of less than 12 mm. This configuration is considered to provide sufficient strength during most stirring operations.

The length h3 of the stem 90 may preferably be long enough so that it can be fixed within the holder 64 by bolts 78 but is otherwise minimised so as to reduce radiant heat loss from the stem 90 into the holder 64. In particular, the ratio h3:d2 (i.e. stem height to shoulder diameter) may be in the range of 0.45 to 0.8.

The stem 90 length h3 should be slightly smaller than the length of the holder cavity 86 to provide the desired insulating air void 98 between the top surface 102 and the holder 64. In particular, the length h3 may be selected to provide an air gap of 0.2 mm-0.3 mm between the top surface 102 and the holder 64.

The ratio of the stem 90 diameter d3 to the shoulder 58 diameter d2 may preferably be in the range of 0.4 to 0.6 so as to provide a sufficient contact area for applying downward forward to the shoulder loading surface 94 but not so large to allow undesirably high heat loss through the interfaces.

The ratio of the stem diameter d3 to the shoulder diameter d2 may preferably be in the range of 0.4 to 0.6 in order to provide a sufficient contact area for applying downward load but not so excessive so as to undesirably increase heat loss from the insert 54 to the holder 64. The thickness of the annular contact interface between the insert loading surface 94 and the holder loading surface 96 is equal to the shoulder diameter d2 minus the stem diameter d3 minus the thickness of the gap (0.2 mm-0.3 mm). In an example having a gap of thickness 0.25 mm, a stem diameter d3 of 12 mm and a d3/d2 ratio of 0.55, the ratio provides a shoulder diameter d2 of approximately 22 mm and an insert loading surface 94 of 5 mm thickness and therefore a loading surface contact interface having a thickness of approximately 4.75 mm.

As noted above, the cavity diameter may be in the range of 0.2 mm to 0.3 mm larger than the diameter of stem 90. The annular contact area between the insert loading surface 94 and the holder loading surface 96 may therefore be equal to the shoulder diameter minus the thickness of the gap, for example d2 minus 0.3 mm.

The diameter of the cavity 86 should be slightly larger (preferably around 0.2-0.3 mm larger) than the diameter d3 of the stem 90 to create the desired insulating air gap surrounding the stem 90.

As discussed in the foregoing, the holder 64 may be formed from H13 steel. However, a variety of alternative materials are also envisaged. Preferred materials may have a thermal conductivity range the same or smaller than H13 and a strength the same or greater than H13, especially at elevated temperatures, it may be suitable for use as holder materials. Therefore, steels, titanium alloys, and nickel-based superalloys (i.e., Hastelloy and Inconel) could be suitable as the material candidates for the tool holder.

The steel family known as "tool steel" has similar thermal conductivity to the H13 tool steel. For almost all steel, including carbon steel and stainless steel, the thermal conductivity is generally low down to 10 W/m-K, and the strength of the steel can be increased at above H13 by controlling the processing parameters.

For titanium alloys, the thermal conductivity is lower than H13. For example, Ti-6Al-4V has a thermal conductivity of 6.6 W/m-K at 20° C. which increases to 17.5 W/m-K at 650° C. The thermal conductivity of titanium alloy varies, but are all below 25 W/m-k, even at elevated temperature. The strength for titanium alloys is satisfactory at room temperature, at around 800~1000 MPa depending on the alloy chemistry. For alloy Ti6242 the yield strength is still above 500 MPa at 650° C. that is higher than H13.

For Nickel based superalloys—e.g. Hastelloy, the thermal conductivity is low i.e. 9.1 W/m-K at room temperature and increases to 21.6 W/m-k at 600° C., which is lower than H13. The Haynes Hastelloy (e.g. C-2000) has lower yield strength of around 750 MPa at room temperature, which is lower than H13 tool steel. However, the yield strength is still around 550 MPa at 649° C. which is higher than H13 steel. This makes the Hastelloy a potential suitable tool holder material for elevated temperature application. The Hastelloy also has good creep and oxidation resistance at elevated temperatures.

For other Nickel based superalloys—e.g. Inconel, strength can be even higher than Hastelloy at elevated temperatures (i.e., Inconel Alloy X-750 has a yield strength of 760 MPa at 550° C.). Its thermal conductivity is around 12 W/m-K at room temperature that is lower than H13.

The tool holder may potentially be formed from a ceramic material. For example, silicon nitride ($Si_3N_4$) is potentially good for a holder material. It has a thermal conductivity around 20 W/m-K, and very high compression strength around 3800 MPa. Zirconia may also be a good candidate with its low thermal conductivity of only around 2 W/m-K.

It will be appreciated from the above discussion that the principles of the FSF process set out above may be adjusted and optimised according to microstructural characterisation and defect analysis in relation to the processing conditions. For example, the stir path, tool rotation speed, tool traverse speed, insert size and configuration, tool materials and other operational parameters may be adjusted or selected according to workpiece material, size or other variables.

It should be appreciated that whilst the illustrated embodiment relates to an annular MMC structure and in particular a locomotive brake disc, the FSF method of the present invention is not limited to formation of a circular structure and may be used to form other shaped MMC structures. For example, the present invention may form MMC structures having a square or rectangular profile. As discussed in the foregoing, may be used to form non-planar or curved MMC structures.

EXAMPLES

Example 1—Forming an MMC Structure Using a Single MMC Layer

The description of embodiments of the invention in the following example is in the context of producing an annular disc shaped MMC structure. In particular, the product to be formed was a locomotive disc brake having an MMC-enhanced braking surface with improved resistance to abrasion and heat.

The MMC structure comprised an aluminium alloy substrate and an MMC layer of AlSiC (silicon carbide particles in an aluminium matrix). However, it will be appreciated that the invention enables production of MMC structures of various metals and alloys thereof and the description should not be interpreted as limiting the embodiments to producing AlSiC products only.

With reference to the accompanying Figures, an FSF process according to the present invention was used to combine an MMC layer 14 onto an aluminium alloy substrate 12. Several Aluminium allows were tested including Al—Si (A356), and Al—Mg—Si (6XXX).

The MMC layer 14 comprised a four aluminium matrix composite (AMC) sheets 16 and, in particular, an AlSiC MMC comprising an aluminium matrix with SiC ceramic powder dispersed in a volume fraction of approximately 25%.

As-cast AMC sheet thickness varied from approximately 6.0 mm to 6.7 mm. In order to achieve a desired final thickness of 5-5.5 mm, the following rolling process was performed:

The rolling mill used was a φ450/800 2-high reversible rolling mill. A guide table was installed adjacent to the twin rollers and aligned to the middle of the roll gap so as to guide the AMC sheet entering the roll gap in order to minimise excessive buckling/bending.

An appropriate lubricate (in particular, rolling oil 1704 was used) was sprayed onto the twin roll surfaces. The AMC sheet was heated at 470° C. for 1 hour in an oven. The sheet was rapidly removed from the oven and placed on the guide table and pushed gently to the roll gap for a first rolling pass in which the roll gap was set at 6.25 mm. After rolling, a quick visual inspection of the rolled sheet was performed for defects. The sheet was then returned to the oven and kept at a temperature of 470° C. for 20-30 minutes.

The above steps were repeated for a second, third and fourth pass in which the roll gap distances were successively reduced. In particular, a roll gap of 5.7 mm for the second pass (thickness reduction of 0.55 mm), 5.4 mm for the third pass (thickness reduction of 0.30 mm) and 5.2 mm for the fourth pass (thickness reduction of 0.20 mm) to achieve a final sheet thickness of between 5-5.5 mm.

It was also noted that, in instances of warping or buckling, the rolled sheets could be flattened under a load of >100 kg at 350° C. for up to 8 hours.

It was noted that cracking of the rolled AMC sheet is a common issue and often unavoidable. Testing has revealed that cracks of sufficiently small size (less than 2.0 mm width) can be repaired during solid state mixing in the subsequent FSF process. In rare cases where cracking could extend to larger than 2.0 mm width, repair of the cracks before FSF is required by tapping a small piece of AMC composite (or similar size to the crack) into the crack to fill the gap.

The AMC sheet was subsequently machined to fit into the recess of the substrate during the FSF process. Relatively tight fitting into the recess of the substrate was desired such that there were almost no gaps between the sheets when the AMC quarters were fitted into the annular recess of the substrate. In particular, a gap of <0.5 mm was desired. A final step of sandblasting the AMC sheet for surface finish improvement was performed. The sandblasting step helps remove surface impurity and improve interface bonding with the substrate and/or additional MMC layers.

The FSF process was then conducted with a friction stirring tool according to the detailed description and drawings of this specification and using the following parameters. The stirred surface 74 was subsequently milled to provide a smooth braking surface on the braking disc.

Stirring tool insert—Tungsten Carbide insert having a probe tip diameter (d1) φ6.2 mm, shoulder diameter (d2) φ22 mm, stem diameter (d3) φ14 mm, probe root diameter (d4) φ8 mm, probe length (h1) 8 mm, shoulder height (h2) 8 mm and stem length (h3) 13 mm.

Tool Back Tilt—3 Degrees.

Tool Rotation—770 rpm.

Tool Plunge Depth—1.2 mm to 1.5 mm (commencing at 1.2 mm and being increased by 0.2 mm for the first pass only when beginning the FSF process for the second, third and fourth quarters).

Tool Plunge Feed Rate—70 mm/min.

Tool Plunge Dwell Time—Cold Start (initial 3 tool passes): 20 seconds

Tool Plunge Dwell Time—Once at Operating Temperature: 10 seconds.

Tool Travel Feed-Rate—60 mm/min.

Tool Pass Interval—Indexed to Advancing Side 4.5 mm-6 mm.

A MMC structure was produced according to this example with a desirable microstructure. In particular, a structure free of surface groove defects or wormhole defects beneath the surface. Workpiece distortion was less than 1.5 mm over a workpiece length of 300-400 mm. Furthermore, the stirring tool WC insert was capable of traversing at least 40 metres without significant wear and was thought to be capable of a further 40 metres before replacement was anticipated.

Whilst the above example of the invention produced a circular MMC structure, it will be appreciated that various shapes, sizes and configurations are possible using a method according to the present invention. Similarly, whilst the above example produced a product requiring only a single sheet of MMC, it should be appreciated that a larger MMC structure could be produced by locating an additional MMC layer on top of the structure and repeating the friction stirring steps. This process could be repeated to additively construct a larger MMC structure until a desired size was achieved.

Example 2—Additively Forming an MMC Structure with Multiple MMC Layers

Figure 18:
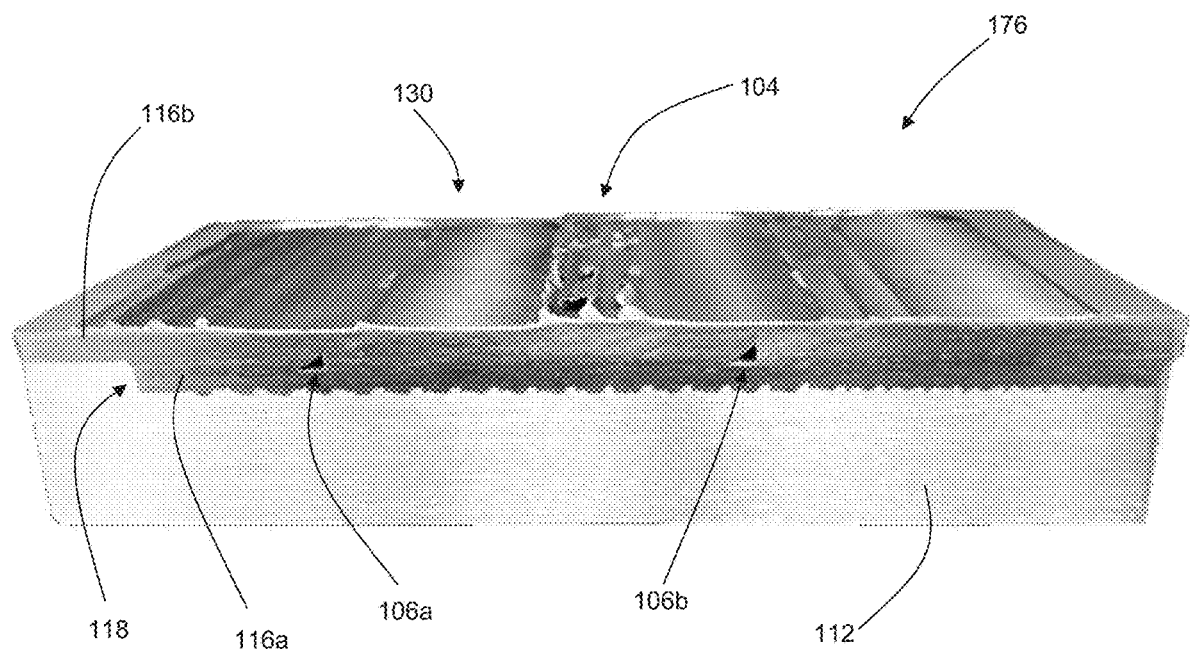
FIG. 18 is a perspective view of an MMC test structure comprising two MMC layers atop a substrate and formed using the present invention and cut-away to illustrate internal layering.
Figure 19:
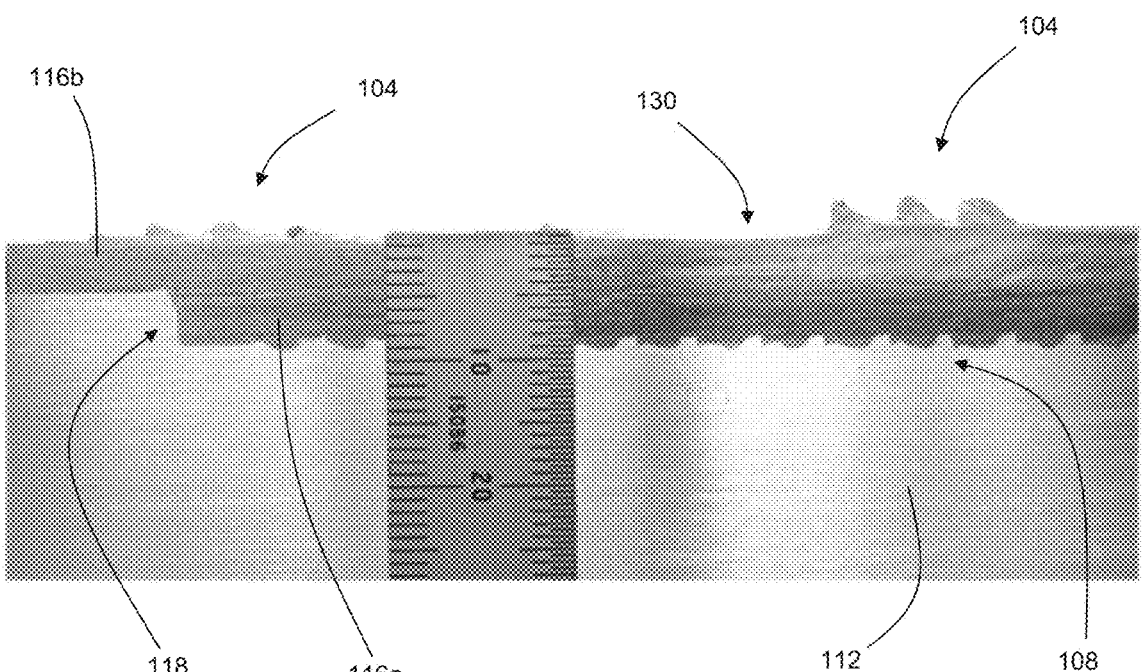
FIG. 19 is a closer view of a portion of FIG. 18.
Figure 20:
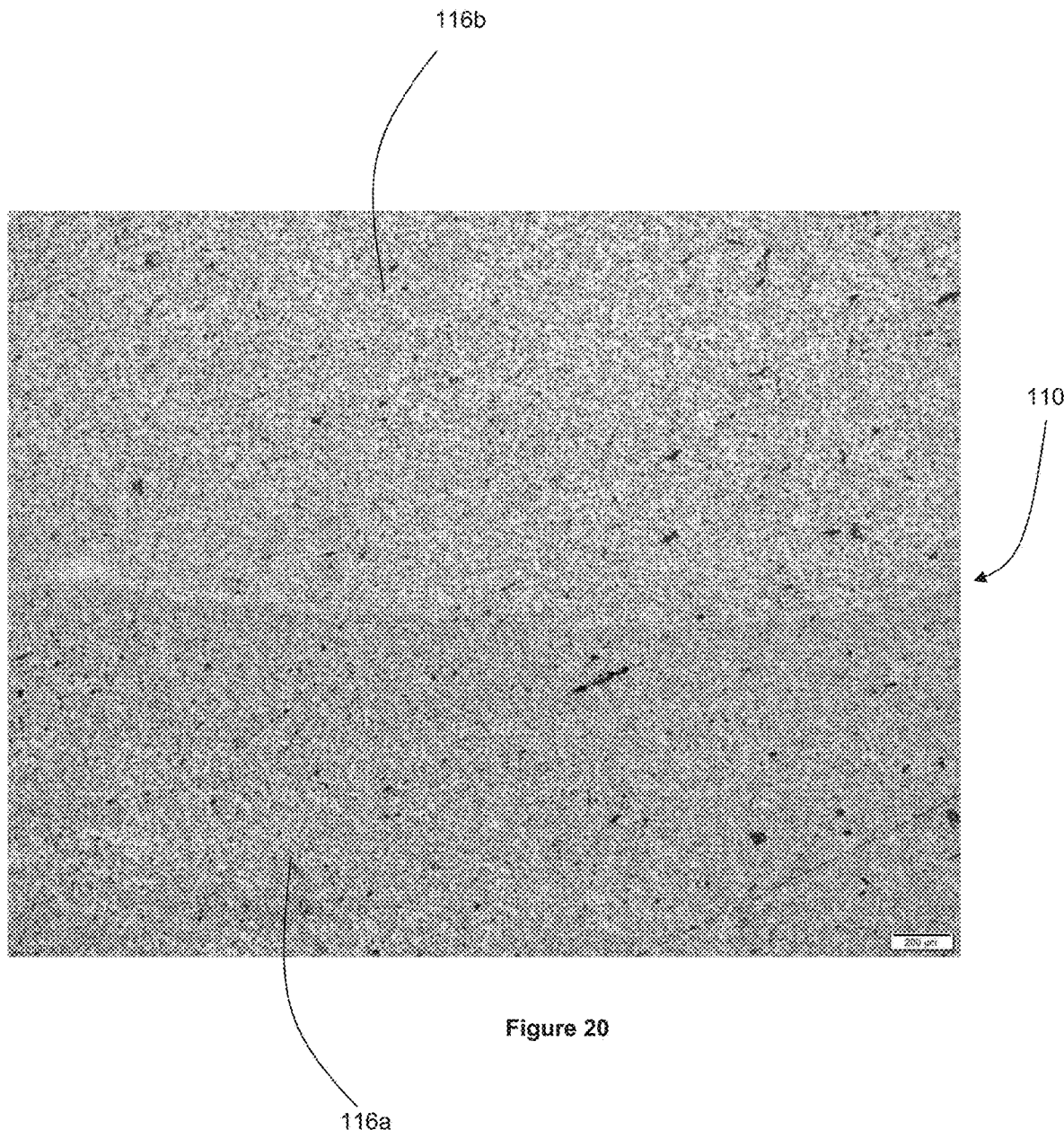
FIG. 20 is a magnified view of the interface between the two MMC layers of FIGS. 18 and 19.

With reference to FIGS. 18 to 20, a second example of the present invention involved formation of a rectangular-shaped MMC structure 176 which was formed from a substrate 112, and a pair of MMC layers comprising a first preformed MMC sheet 116a and a second preformed MMC sheet 116b. The substrate 112 is formed of 6802 aluminium allow and each of the preformed MMC sheets 116a, 116b were AMC sheets comprising AlSiC.

The MMC structure 176 was a test structure used for a series of tests investigating the process of integrating the pair of MMC sheets 116a, 116b.

A rectangular recess 118 was machined into a top surface of an Aluminium alloy substrate 112. The first preformed MMC sheet 116a having a corresponding size to the recess 118 was located and secured within the recess 118. A first FSF process was then performed according to the above-described FSF process of the present invention to stir and integrate the first MMC sheet 116a with the substrate 112.

After completing the first FSF process, a top surface of the resulting structure was machined to smooth the top surface. A second MMC sheet 116b was then secured on top of the first MMC sheet 116a. The second MMC sheet 116b was directly overlaid and not located within a recess. A second FSF process was then repeated on the second MMC sheet 116b in order stir and integrate the second MMC sheet 116b with the first MMC sheet 116a.

The physical stirring tool parameters used in Example 2 were equivalent to the stirring tool parameters used in Example 1 and noted above.

Example 2 was used as a test to observe formation of material defects and, in particular, internal wormhole defects. In order to observe formation of said defects. The friction stirring path used in Example 2 did not include continually overlapping stir passes throughout the whole structure 176, as might normally be performed in a preferred embodiment of the present invention. Rather, overlapping stir passes were performed through only portions of the structure.

FIG. 18 illustrates two wormhole defects comprising a left wormhole defect 106a and a right wormhole defect 106b. The two wormhole defects formed near the interface of the first and second MMC sheets 116a, 116b. Overlapping stirring passes were performed in the left side of the structure 176 (overlapping in the direction of left to right when viewed from the perspective in FIG. 18). The left wormhole 106a is where the overlapping stirring passes ended and therefore is the location to which wormhole 106a was pushed by the overlapping stir passes. Some additional overlapping stirring passes were also performed from around the centre of structure 176 and ended at the location of the right wormhole defect 106b. As with the left wormhole defect 106a, the right wormhole defect was pushed through the structure 176 and eventually located where the overlapping stirring passes concluded.

The overlapping stir passes were indexed in a rightward direction (as viewed from FIG. 18) and were deliberately terminated mid-structure (i.e. not at an edge of the structure) to investigate wormhole defects. In particular, wormhole defects 106a and 106b were observed to have been moved in a rightward direction (as viewed in FIG. 18) with the overlapping stir passes to their final locations where the overlapping stir passes were ended. Example 2 and FIG. 18 therefore illustrates how an overlapping stir path could advantageously move, direct, push or otherwise relocate wormhole defects through a structure and to a preferred position within the structure. For example, toward an edge of a structure where the defects could be conveniently removed. It will therefore be appreciated that a fully integrated and multi-layered MMC structure can be produced without such defects using the present invention.

FIGS. 18 and 19 also illustrate MMC structure 176 prior to a final surface finishing process. Some material flashing 104 is therefore visible on the top surface 130 of the structure 176. A further surface finishing step of milling top surface 130 could be subsequently performed to provide a smooth surface if structure 176 was intended for use as an MMC component or if the FSF process were to be repeated in with a third MMC sheet in order to further enlarge the MMC structure 176.

As best shown in FIG. 19, the interface between the substrate 112 and the first MMC sheet 116a is clearly visible due to difference in material colour but also due to the non-linear interface pattern 108 which comprises bumps/grooves. The interface pattern 108 may vary depending on various parameters of the FSF process including the interface shapes, tool design, operational parameters, the FSF stir path route, MMC layer thickness and the hardness of the MMC layer.

The non-linear/non-planar interface between a substrate and the MMC layer may be desirable in certain instances due to increased total interface area providing increased adhesion between layers. The corrugated or oscillating interface may also provide a degree of mechanical interlock between layers.

In contrast to the interface between the substrate 112 and the first MMC sheet 116a which is visible in FIGS. 18 and 20, the interface between the first MMC sheet 116a and the second MMC sheet 116b is less discernible. Turning to FIG. 20, a magnified perspective of this interface is shown in which the two layers can be faintly distinguished at the slightly curved interface 110.

Example 2 demonstrates that an enlarged or bulk MMC structure can be produced by repeating the FSF process of the present invention using additional preformed MMC sheets. Furthermore, Example 2 demonstrated that an acceptable result can be achieved without the need to necessarily recess the second MMC sheet 116b into the first MMC sheet 116a.

Spatial references herein are generally based upon a workpiece orientated on a horizontal work platform, the workpiece having a horizontal and upwardly-facing surface. It will be appreciated that friction stirring processes are typically performed by a stirring tool positioned above the workpiece and lowered into contact with the upper surface of the workpiece. With this environment as basis, terms such as 'horizontal' and 'vertical' will be understood in this context. Furthermore, terms such as "upper", "lower", "upwardly", "downwardly", "upwards", "downwards" and the like, will be appreciated and understood in this context.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A method for friction stir forming a metal matrix composite (MMC) structure, the method including the steps of:
    a) providing a substrate comprising a metallic material and securing a preformed MMC layer comprising an MMC material in a position overlying at least a portion of the substrate; and
    b) friction stirring the preformed MMC layer with a friction stirring tool which includes a rotating probe, including locating the probe at a stirring depth at which the probe extends through the preformed MMC layer into a portion of the substrate and passing the rotating probe through the preformed MMC layer at the stirring depth to friction stir the preformed MMC layer and integrate the preformed MMC layer with the substrate; wherein the rotating probe is passed through the preformed MMC layer along an overlapping stir path and wherein the stir path is configured to relocate defects to an edge of the MMC structure to facilitate subsequent removal.

2. A method according to claim 1, wherein the stirring tool stirs substantially all of the MMC material in the preformed MMC layer.

3. A method according to claim 1, wherein the preformed MMC layer comprises a rigid sheet.

4. A method according to claim 1, wherein the preformed MMC layer comprises a metal/ceramic MMC material and wherein the preformed MMC layer has a ceramic volume fraction of at least 20%.

5. A method according to claim 1, wherein the preformed MMC layer is secured within a recess of the substrate.

6. A method according to claim 1, wherein securing the preformed MMC layer to the substrate comprises one or more initial passes of the friction stirring tool.

7. A method according to claim 1, wherein the friction stirring tool includes a rotating shoulder in contact with a surface of the preformed MMC layer and wherein the probe and shoulder are integrally formed in a tool insert and wherein the friction stirring tool further includes a holder for receiving the insert and wherein the insert and holder are configured to minimise heat transfer from the insert to the holder.

8. A method according to claim 1, wherein the friction stirring tool includes a rotating shoulder in contact with a surface of the preformed MMC layer and wherein the shoulder is circular and a ratio of the shoulder diameter to a root probe diameter is approximately between 3:1 and 5:1.

9. A method according to claim 1, wherein the substrate is removably secured to a support plate and wherein the support plate is invertible after completion of the friction stirring performed using a first side of the support plate to permit a subsequent friction stirring operation performed using a second and opposite side of the support plate.

10. A method according to claim 1, wherein the MMC layer comprises a plurality of preformed MMC segments.

11. A method according to claim 10, wherein each preformed MMC segment comprises a rigid MMC sheet.

12. A method according to claim 10, wherein the preformed MMC segments are stirred one-by-one according to a predetermined stirring sequence.

13. A method according to claim 10, wherein the MMC layer has a planar configuration and the plurality of MMC segments is arranged in an approximately co-planar arrangement to collectively form the MMC layer.

14. A method according to claim 1, wherein the stir path includes a series of overlapping stir passes which conclude at or adjacent an edge of the structure.

15. A method according to claim 5, wherein the MMC layer corresponds in shape to the recess.

16. A method according to claim 5, wherein the MMC layer comprises a plurality of MMC segments which collectively form a shape corresponding to the substrate recess.

17. A method according to claim 7, wherein the tool insert is formed of an insert material and the holder is formed of a holder material having a lower thermal conductivity than the inset material.

18. A method according to claim 7, wherein the stirring tool includes a void within the holder which surrounds at least a portion of the insert.

19. A method according to claim 1, wherein the probe is frustoconical and has a tapering angle of between 10° to 20°.

* * * * *